(12) United States Patent
Feng et al.

(10) Patent No.: US 12,469,460 B2
(45) Date of Patent: Nov. 11, 2025

(54) DISPLAY SUBSTRATE AND DISPLAY DEVICE

(71) Applicants: HEFEI BOE JOINT TECHNOLOGY CO., LTD., Hefei (CN); BOE TECHNOLOGY GROUP CO., LTD., Beijing (CN)

(72) Inventors: Xuehuan Feng, Beijing (CN); Yongqian Li, Beijing (CN)

(73) Assignees: HEFEI BOE JOINT TECHNOLOGY CO., LTD, Hefei (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/247,464

(22) PCT Filed: Jun. 23, 2022

(86) PCT No.: PCT/CN2022/100838
§ 371 (c)(1),
(2) Date: Mar. 31, 2023

(87) PCT Pub. No.: WO2023/245563
PCT Pub. Date: Dec. 28, 2023

(65) Prior Publication Data
US 2024/0363077 A1 Oct. 31, 2024

(51) Int. Cl.
*G09G 3/3266* (2016.01)
*G09G 3/3208* (2016.01)

(52) U.S. Cl.
CPC ... *G09G 3/3266* (2013.01); *G09G 2310/0286* (2013.01); *G09G 2310/08* (2013.01); *G09G 2320/045* (2013.01)

(58) Field of Classification Search
CPC ............................. G09G 3/3677; G09G 3/3266
See application file for complete search history.

(56) References Cited

U.S. PATENT DOCUMENTS 6,555,883 B1 * 4/2003 Disney .............. H01L 29/41775
257/E29.12
11,705,047 B2 * 7/2023 Feng .................... G09G 3/3266
345/204

(Continued)

FOREIGN PATENT DOCUMENTS

CN 104064159 A 9/2014
CN 107037656 A 8/2017
(Continued)

OTHER PUBLICATIONS

ISR from the PCT application No. PCT/CN2022/100838, which has the mailing date on Mar. 17, 2023.

*Primary Examiner* — Sepehr Azari
(74) *Attorney, Agent, or Firm* — Dilworth & Barrese, LLP.; Michael J. Musella, Esq.

(57) ABSTRACT

A display substrate and a display device are provided. The display substrate includes a base substrate, and a gate driving circuit and a plurality of signal lines arranged on the base substrate; the plurality of signal lines include a first clock sub-signal line and a second clock sub-signal line; an orthographic projection of the first clock sub-signal line on the base substrate and an orthographic projection of the second clock sub-signal line on the base substrate are arranged side by side, and the first clock sub-signal provided by the first clock sub-signal line is the same as the second clock sub-signal provided by the second clock sub-signal line.

20 Claims, 24 Drawing Sheets

(56) References Cited

U.S. PATENT DOCUMENTS

| | | |
|---|---|---|
| 2016/0284293 A1 | 9/2016 | Dai |
| 2017/0309242 A1* | 10/2017 | Kim .................. H01L 29/78633 |
| 2017/0316730 A1 | 11/2017 | Cheng et al. |
| 2018/0158846 A1* | 6/2018 | Umezaki ............. G02F 1/13624 |
| 2018/0166585 A1* | 6/2018 | Takechi ................ G09G 3/3266 |
| 2018/0308445 A1* | 10/2018 | Park ...................... G09G 3/3677 |
| 2019/0165076 A1* | 5/2019 | Lee ....................... H10K 59/131 |
| 2020/0168162 A1* | 5/2020 | Feng .................... G09G 3/3266 |
| 2021/0082328 A1* | 3/2021 | Feng .................... G09G 3/3266 |
| 2021/0158742 A1* | 5/2021 | Feng ....................... G11C 19/28 |
| 2022/0383820 A1 | 12/2022 | Zeng et al. |
| 2023/0282170 A1* | 9/2023 | Shang ..................... G11C 19/28 345/206 |

FOREIGN PATENT DOCUMENTS

| | | |
|---|---|---|
| CN | 110858469 A | 3/2020 |
| CN | 114550635 A | 5/2022 |
| EP | 3841567 A1 | 6/2021 |
| WO | 2021031167 A1 | 2/2021 |

\* cited by examiner

DISPLAY SUBSTRATE AND DISPLAY DEVICE

TECHNICAL FIELD

The embodiments of the present disclosure relate to a shift register unit, a gate driving circuit, a display device, and a driving method.

BACKGROUND

In a display field, especially in an OLED (Organic Light-Emitting Diode) display panel, a gate driving circuit is generally integrated in a GATE IC at present. The area of the chip in the IC design is a major factor that affects the cost of the chip. How to effectively reduce the area of the chip is what the technical developers need to focus on.

At present, the gate driving circuit used for the OLED is usually composed of three sub-circuits, namely, a detection circuit, a display circuit, and a connection circuit (or a gate circuit) that outputs composite pulses of the detection circuit and the display circuit. Such a circuit structure is very complex and cannot meet the requirements of high resolution and narrow frame of the display panel.

SUMMARY

An embodiment of the present disclosure provides a display substrate, comprising: a base substrate, and a gate driving circuit and a plurality of signal lines arranged on the base substrate; the plurality of signal lines comprise a first clock sub-signal line and a second clock sub-signal line; the gate driving circuit comprises a plurality of shift register units that are cascaded, each shift register unit of the plurality of shift register units that are cascaded comprises a first sub-unit and a blanking input sub-unit; the first sub-unit comprises a first input circuit, a first output circuit, a first control circuit, and a third control circuit, the blanking input sub-unit comprises a first transmission circuit, a selection control circuit, and a third input circuit; the first input circuit is configured to control a level of a first node in response to a first input signal; the first output circuit is configured to output a shift signal and a first output signal under control of the level of the first node; the first transmission circuit is electrically connected with the first node and a fourth node, and is configured to control the level of the first node under control of a level of the fourth node or a first transmission signal; the selection control circuit is configured to control a level of a third node using a second input signal in response to a selection control signal, and to maintain the level of the third node; the third input circuit is connected with the third node, the fourth node, and the first clock sub-signal line, and is configured to transmit a first clock sub-signal provided by the first clock sub-signal line to the fourth node under control of the level of the third node to control the level of the fourth node; the first control circuit is configured to control a level of a fifth node under control of the level of the first node and a second voltage; the third control circuit is connected with the second clock sub-signal line and the fifth node, and is configured to control the level of the fifth node in response to a second clock sub-signal provided by the second clock sub-signal line; an orthographic projection of the first clock sub-signal line on the base substrate and an orthographic projection of the second clock sub-signal line on the base substrate are arranged side by side, and the first clock sub-signal provided by the first clock sub-signal line is the same as the second clock sub-signal provided by the second clock sub-signal line.

For example, in the display substrate provided by at least one embodiment of the present disclosure, the shift register unit further comprises a second sub-unit, the second sub-unit comprises a second input circuit, a second output circuit, a second control circuit, a fifth control circuit, and a sixth control circuit, the second input circuit is configured to control a level of a second node in response to the first input signal; the second output circuit is configured to output a second output signal under control of the level of the second node; the second control circuit is configured to control a level of a sixth node under control of the level of the second node and a third voltage; the fifth control circuit is connected with the second clock sub-signal line and the sixth node, and is configured to control the level of the sixth node in response to the second clock sub-signal provided by the second clock sub-signal line; and the sixth control circuit is configured to control the level of the sixth node in response to the first input signal.

For example, in the display substrate provided by at least one embodiment of the present disclosure, the first sub-unit further comprises a fourth control circuit, a first reset circuit, a second reset circuit, a shift signal output terminal, and a first output signal terminal, the shift signal output terminal is configured to output the shift signal, and the first output signal terminal is configured to output the first output signal; the first reset circuit is configured to reset the first node, the shift signal output terminal, and the first output signal terminal under control of the level of the fifth node; the second reset circuit is configured to reset the first node, the shift signal output terminal, and the first output signal terminal under control of the level of the sixth node; and the fourth control circuit is configured to control the level of the fifth node in response to the first input signal.

For example, in the display substrate provided by at least one embodiment of the present disclosure, the second sub-unit further comprises a third reset circuit, a fourth reset circuit, and a second output signal terminal; the second output signal terminal is configured to output the second output signal; the third reset circuit is configured to reset the second node and the second output signal terminal under control of the level of the sixth node; and the fourth reset circuit is configured to reset the second node and the second output signal terminal under control of the level of the fifth node.

For example, in the display substrate provided by at least one embodiment of the present disclosure, the blanking input sub-unit further comprises a second transmission circuit and a common reset circuit, the second transmission circuit is electrically connected with the second node and the fourth node, and is configured to control the level of the second node under control of the level of the fourth node or a second transmission signal; and the common reset circuit is electrically connected with the fourth node, the fifth node, and the sixth node, and is configured to reset the fourth node under control of the level of the fifth node or the sixth node.

For example, in the display substrate provided by at least one embodiment of the present disclosure, the selection control circuit comprises a first transistor and a first capacitor; a gate electrode of the first transistor is configured to receive the selection control signal, a first electrode of the first transistor is configured to receive the second input signal, and a second electrode of the first transistor is connected with the third node, and a first electrode of the first capacitor is connected with the third node.

For example, in the display substrate provided by at least one embodiment of the present disclosure, the third input circuit comprises a second transistor; a gate electrode of the second transistor is connected with the third node, a first electrode of the second transistor is connected with the first clock sub-signal line to receive the first clock sub-signal, and a second electrode of the second transistor is connected with the fourth node.

For example, in the display substrate provided by at least one embodiment of the present disclosure, a distance between an orthographic projection of the gate electrode of the second transistor on the base substrate and an orthographic projection of the first electrode of the second transistor on the base substrate is greater than 3 microns.

For example, in the display substrate provided by at least one embodiment of the present disclosure, the first transmission circuit comprises a third transistor and the second transmission circuit comprises a fourth transistor; a gate electrode of the third transistor is connected with the fourth node, a first electrode of the third transistor is configured to receive the first voltage, and a second electrode of the third transistor is connected with the first node; and a gate electrode of the fourth transistor is connected with the fourth node, a first electrode of the fourth transistor is configured to receive the first voltage, and a second electrode of the fourth transistor is connected with the second node.

For example, in the display substrate provided by at least one embodiment of the present disclosure, the first input circuit comprises a fifth transistor, and the first output circuit comprises a sixth transistor, a seventh transistor, and a second capacitor; a gate electrode of the fifth transistor is configured to receive the first input signal, a first electrode of the fifth transistor is configured to receive the first voltage, and a second electrode of the fifth transistor is connected with the first node; a gate electrode of the sixth transistor is connected with the first node, a first electrode of the sixth transistor is configured to receive the second clock sub-signal as the shift signal, and a second electrode of the sixth transistor is configured to output the shift signal; a gate electrode of the seventh transistor is connected with the first node, a first electrode of the seventh transistor is configured to receive a third clock signal as the first output signal, and a second electrode of the seventh transistor is configured to output the first output signal; and a first electrode of the second capacitor is connected with the first node, and a second electrode of the second capacitor is connected with the second electrode of the seventh transistor.

For example, in the display substrate provided by at least one embodiment of the present disclosure, the second input circuit comprises an eighth transistor, and the second output circuit comprises a ninth transistor and a third capacitor; a gate electrode of the eighth transistor is configured to receive the first input signal, a first electrode of the eighth transistor is configured to receive the first voltage, and a second electrode of the eighth transistor is connected with the second node; a gate electrode of the ninth transistor is connected with the second node, a first electrode of the ninth transistor is configured to receive a fourth clock signal as the second output signal, and a second electrode of the ninth transistor is configured to output the second output signal; and a first electrode of the third capacitor is connected with the second node, and a second electrode of the third capacitor is connected with the second electrode of the ninth transistor.

For example, in the display substrate provided by at least one embodiment of the present disclosure, the common reset circuit comprises a tenth transistor and an eleventh transistor; a gate electrode of the tenth transistor is connected with the fifth node, a first electrode of the tenth transistor is connected with the fourth node, and a second electrode of the tenth transistor is configured to receive a fourth voltage; and a gate electrode of the eleventh transistor is connected with the sixth node, a first electrode of the eleventh transistor is connected with the fourth node, and a second electrode of the eleventh transistor is configured to receive the fourth voltage.

For example, in the display substrate provided by at least one embodiment of the present disclosure, the first control circuit comprises a twelfth transistor and a thirteenth transistor, the first reset circuit comprises a fourteenth transistor, a fifteenth transistor, and a sixteenth transistor, and the second reset circuit comprises a seventeenth transistor, an eighteenth transistor, and a nineteenth transistor; a gate electrode and a first electrode of the twelfth transistor are configured to receive the second voltage, and a second electrode of the twelfth transistor is connected with the fifth node; a gate electrode of the thirteenth transistor is connected with the first node, a first electrode of the thirteenth transistor is connected with the fifth node, and a second electrode of the thirteenth transistor is configured to receive the fourth voltage; a gate electrode of the fourteenth transistor is connected with the fifth node, a first electrode of the fourteenth transistor is connected with the first node, and a second electrode of the fourteenth transistor is configured to receive the fourth voltage; a gate electrode of the fifteenth transistor is connected with the fifth node, a first electrode of the fifteenth transistor is connected with the shift signal output terminal, and a second electrode of the fifteenth transistor is configured to receive the fourth voltage; a gate electrode of the sixteenth transistor is connected with the fifth node, a first electrode of the sixteenth transistor is connected with the first output signal terminal, and a second electrode of the sixteenth transistor is configured to receive the fifth voltage; a gate electrode of the seventeenth transistor is connected with the sixth node, a first electrode of the seventeenth transistor is connected with the first node, and a second electrode of the seventeenth transistor is configured to receive the fourth voltage; a gate electrode of the eighteenth transistor is connected with the sixth node, a first electrode of the eighteenth transistor is connected with the shift signal output terminal, and a second electrode of the eighteenth transistor is configured to receive the fourth voltage; and a gate electrode of the nineteenth transistor is connected with the sixth node, a first electrode of the nineteenth transistor is connected with the first output signal terminal, and a second electrode of the nineteenth transistor is configured to receive the fifth voltage.

For example, in the display substrate provided by at least one embodiment of the present disclosure, the second control circuit comprises a twentieth transistor and a twenty-first transistor, the third reset circuit comprises a twenty-second transistor and a twenty-third transistor, and the fourth reset circuit comprises a twenty-fourth transistor and a twenty-fifth transistor; a gate electrode and a first electrode of the twentieth transistor are configured to receive the third voltage, and a second electrode of the twentieth transistor is connected with the sixth node; a gate electrode of the twenty-first transistor is connected with the second node, a first electrode of the twenty-first transistor is connected with the sixth node, and a second electrode of the twenty-first transistor is configured to receive the fourth voltage; a gate electrode of the twenty-second transistor is connected with the sixth node, a first electrode of the twenty-second transistor is connected with the second node, and a second electrode of the twenty-second transistor is configured to receive the fourth voltage; a gate electrode of the twenty-third transistor is connected with the sixth node, a first electrode of the twenty-third transistor is connected with the second output signal terminal, and a second electrode of the twenty-third transistor is configured to receive the fifth voltage; a gate electrode of the twenty-fourth transistor is connected with the fifth node, a first electrode of the twenty-fourth transistor is connected with the second node, and a second electrode of the twenty-fourth transistor is configured to receive the fourth voltage; and a gate electrode of the twenty-fifth transistor is connected with the fifth node, a first electrode of the twenty-fifth transistor is connected with the second output signal terminal, and a second electrode of the twenty-fifth transistor is configured to receive the fifth voltage.

For example, in the display substrate provided by at least one embodiment of the present disclosure, the first sub-unit further comprises a third output signal terminal, and the third output signal terminal is configured to output a third output signal the second sub-unit further comprises a fourth output signal terminal, and the fourth output signal terminal is configured to output a fourth output signal; the first reset circuit and the second reset circuit are further configured to reset the third output signal terminal; and the third reset circuit and the fourth reset circuit are further configured to reset the fourth output signal terminal.

For example, in the display substrate provided by at least one embodiment of the present disclosure, the first sub-unit further comprises a fifth reset circuit and a sixth reset circuit, the fifth reset circuit is configured to reset the first node in response to a display reset signal, and the sixth reset circuit is configured to reset the first node in response to a global reset signal; and the second sub-unit further comprises a seventh reset circuit and an eighth reset circuit, the seventh reset circuit is configured to reset the second node in response to the display reset signal, and the eighth reset circuit is configured to reset the second node in response to the global reset signal.

For example, the display substrate provided by at least one embodiment of the present disclosure further comprises: a common leakage prevention circuit, a first leakage prevention circuit, a second leakage prevention circuit, a third leakage prevention circuit, and a fourth leakage prevention circuit; the common leakage prevention circuit is electrically connected with the first node and a seventh node, and is configured to control a level of the seventh node under control of the level of the first node; the first leakage prevention circuit is electrically connected with the seventh node, the first reset circuit, the second reset circuit, the fifth reset circuit, and the sixth reset circuit, and is configured to prevent the first node from generating current-leakage under control of the level of the seventh node; and the second leakage prevention circuit is electrically connected with the seventh node, the third reset circuit, the fourth reset circuit, the seventh reset circuit, and the eighth reset circuit, and is configured to prevent the second node from generating current-leakage under control of the level of the seventh node.

For example, in the display substrate provided by at least one embodiment of the present disclosure, the third control circuit comprises a thirty-second transistor and a thirty-third transistor; a gate electrode of the thirty-second transistor is connected with the second clock sub-signal line to receive the second clock sub-signal, a first electrode of the thirty-second transistor is connected with the fifth node, and a second electrode of the thirty-second transistor is connected with a first electrode of the thirty-third transistor; a gate electrode of the thirty-third transistor is connected with the third node, and a second electrode of the thirty-third transistor is configured to receive a fourth voltage.

For example, in the display substrate provided by at least one embodiment of the present disclosure, the fifth control circuit comprises a thirty-fifth transistor and a thirty-sixth transistor; a gate electrode of the thirty-fifth transistor is connected with the second clock sub-signal line to receive the second clock sub-signal, a first electrode of the thirty-fifth transistor is connected with the sixth node, and a second electrode of the thirty-fifth transistor is connected with a first electrode of the thirty-sixth transistor; and a gate electrode of the thirty-sixth transistor is connected with the third node, and a second electrode of the thirty-sixth transistor is configured to receive a fourth voltage; the sixth control circuit comprises a thirty-seventh transistor; a gate electrode of the thirty-seventh transistor is configured to receive the first input signal, a first electrode of the thirty-seventh transistor is connected with the sixth node, and a second electrode of the thirty-seventh transistor is configured to receive the fourth voltage.

For example, in the display substrate provided by at least one embodiment of the present disclosure, a plurality of shift register units connected with a same signal line in the plurality of shift register units, which is cascade, of the gate driving circuit are continuously arranged.

At least one embodiment of the present disclosure also provides a display device, comprising the display substrate provided by any embodiment of the present disclosure.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, the design of large size OLEDs is based on the technology of thin film transistor (TFT), and the technology has leakage problem. Especially in a sense process, because the clock signal (such as a first clock sub-signal CLKA1 described below) is used as the drain signal of the TFT, the voltage will be reduced due to leakage, as a result, the gate driving circuit cannot output a random compensation signal, thus causing the compensation of display panel to fail.

Figure 1A:
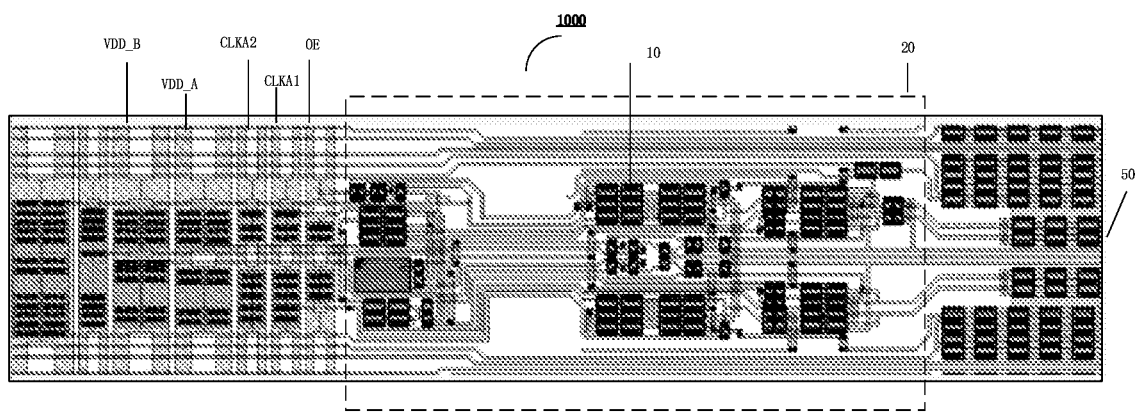
FIG. 1A is a schematic diagram of a display substrate provided by an embodiment of the present disclosure.
Figure 1B:
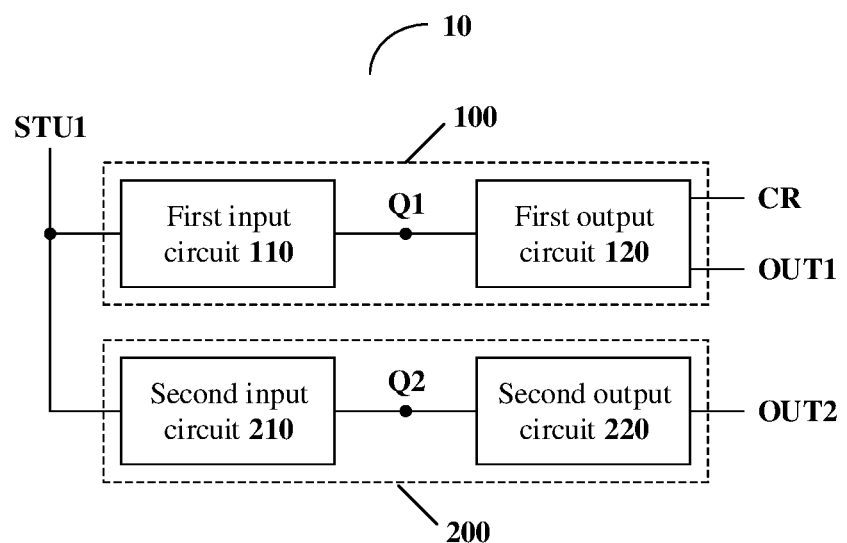
FIG. 1B is a schematic diagram of a shift register unit provided by an embodiment of the present disclosure.
Figure 1C:
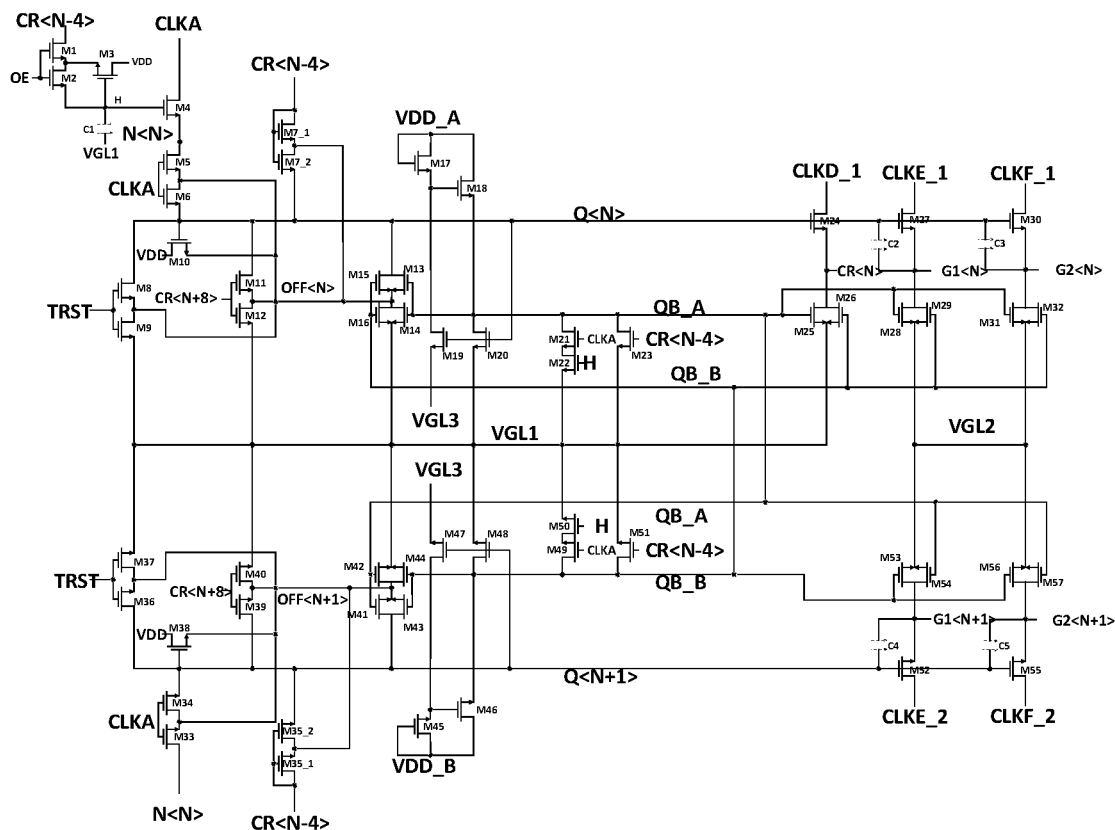
FIG. 1C is a circuit diagram of an existing shift register unit.

For example, in the circuit shown in FIG. 1C, during the sensing input process, because the TFT is a depleted TFT, when the clock signal CLKA is at a high level, except for the shift register units in an eleventh row and a twelfth row (for example, taking the shift register units in the eleventh row and the twelfth row as examples for introducing), the clock signal CLKA of other rows connected to the drain electrode of the transistor M4 will leak through transistors M4, M5, M6, M33, and M34, in this case, the gate electrodes of transistors M5, M6, M33, and M34 in all rows of the shift register units are at a high potential. As long as a voltage Vgs between the gate electrode and the drain electrode of transistor M4 is 0 or positive, there will be leakage, if there are 4320 rows of shift register units, the leakage value of each row should be multiplied by 4318. This value will cause the potential of the clock signal CLKA to not reach the set value of 24V (assuming that the set value is 24V), and may only be 15V, in this case, the threshold voltages of the transistors M5, M6, M33, and M34 are positive, then after the clock signal CLKA is input to the node N, there will be the threshold voltage loss of the transistors M5, M6, M33 and M34, as a result, the potentials reaching Q<11> and Q<12> are insufficient to raise the potential of the node Q until the inverter flips, which will make it impossible to perform sense during the blanking period.

At least one embodiment of the present disclosure provides a display substrate, comprising: a base substrate, and a gate driving circuit and a plurality of signal lines arranged on the base substrate; the plurality of signal lines comprise a first clock sub-signal line and a second clock sub-signal line; the gate driving circuit comprises a plurality of shift register units that are cascaded, each shift register unit of the plurality of shift register units that are cascaded comprises a first sub-unit, a second sub-unit, and a blanking input sub-unit; the first sub-unit comprises a first input circuit, a first output circuit, a first control circuit, and a third control circuit, the second sub-unit comprises a second input circuit, a second output circuit, and a second control circuit, the blanking input sub-unit comprises a first transmission circuit, a second transmission circuit, a selection control circuit, and a third input circuit; the first input circuit is configured to control a level of a first node in response to a first input signal; the first output circuit is configured to output a shift signal and a first output signal under control of the level of the first node; the second input circuit is configured to control a level of a second node in response to the first input signal; the second output circuit is configured to output a second output signal under control of the level of the second node; the first transmission circuit is electrically connected with the first node and a fourth node, and is configured to control the level of the first node under control of a level of the fourth node or a first transmission signal; the second transmission circuit is electrically connected with the second node and the fourth node, and is configured to control the level of the second node under control of the level of the fourth node or a second transmission signal; the selection control circuit is configured to control a level of a third node using a second input signal in response to a selection control signal, and to maintain the level of the third node; the third input circuit is connected with the third node, the fourth node, and the first clock sub-signal line, and is configured to transmit a first clock sub-signal provided by the first clock sub-signal line to the fourth node under control of the level of the third node to control the level of the fourth node; the first control circuit is configured to control a level of a fifth node under control of the level of the first node and a second voltage; the second control circuit is configured to control a level of a sixth node under control of the level of the second node and a third voltage; the third control circuit is connected with the second clock sub-signal line and the fifth node, and is configured to control the level of the fifth node in response to a second clock sub-signal provided by the second clock sub-signal line; an orthographic projection of the first clock sub-signal line on the base substrate and an orthographic projection of the second clock sub-signal line on the base substrate are arranged side by side, and the first clock sub-signal provided by the first clock sub-signal line is the same as the second clock sub-signal provided by the second clock sub-signal line.

The embodiments of the present disclosure also provide a display device corresponding to the above-mentioned display substrate.

The display substrate provided by the embodiment of the present disclosure can make the voltage of the signal on the second clock sub-signal line connected with the gate electrode of the transistor not be reduced due to the leakage of the clock signal on the first clock sub-signal line connected with the drain electrode of the transistor by respectively providing the first clock sub-signal line and the second clock sub-signal line that provide the same clock signal, thus avoiding the problem that the gate driving circuit cannot output the random compensation signal caused by the insufficient voltage of the gate electrode of the transistor due to the leakage of the same signal connected to the gate electrode of the transistor because of the leakage of the signal of the drain electrode of the transistor when the signal is supplied to the drain electrode and the gate electrode of the transistor through the same signal line (that is, when the first clock sub-signal line and the second clock sub-signal are the same signal line), and ensuring effective compensation for the display panel.

It should be noted that in the embodiments of the present disclosure, random compensation refers to an external compensation method that is different from line-by-line sequential compensation. During a blanking period of a certain frame, a sensing driving signal corresponding to sub-pixel units in any row of the display panel can be randomly output. The following embodiments are the same and will not be repeated.

In addition, in the embodiments of the present disclosure, for the purpose of illustration, the definition of "one frame", "each frame", or "a certain frame" includes a display period and a blanking period in sequence, for example, in the display period, the gate driving circuit outputs driving signals, which can drive the display panel to complete the scanning display of a complete image from the first row to the last row. During the blanking period, the gate driving circuit outputs a driving signal, which can be used to drive sensing transistors in a row of sub-pixel units in the display panel to complete the external compensation of the row of sub-pixel units.

The embodiments and examples of the present disclosure will be described in detail with the accompanying drawings.

At least one embodiment of the present disclosure provides a display substrate, as shown in FIG. 1A. The display substrate 1000 comprises a base substrate 50, and a gate driving circuit 20 and a plurality of signal lines arranged on the base substrate 50. For example, the plurality of signal lines comprise a first clock sub-signal line CLKA1 and a second clock sub-signal line CLKA2. The gate driving circuit 20 comprises a plurality of shift register units 10 that are cascaded. For example, as shown in FIG. 1A, the plurality of signal lines also comprise a selection control signal line OE, a second voltage line VDD_A, a third voltage line VDD_B, and the like, and can also comprise more or less signal lines, which will not be repeated here.

For example, a first clock sub-signal provided by the first clock sub-signal line CLKA1 is the same as a second clock sub-signal provided by the second clock sub-signal line CLKA2, that is, the same signal is provided by two signal lines, and its specific connection mode will be described in detail below.

As shown in FIG. 1B, the shift register unit 10 comprises a first sub-unit 100 and a second sub-unit 200. The plurality of the shift register units 10 can be cascaded to construct the gate driving circuit provided by an embodiment of the present disclosure. The gate driving circuit can be used in the display device to provide scanning signals during the display of one frame of the display device.

The first sub-unit 100 includes a first input circuit 110 and a first output circuit 120. The first input circuit 110 is configured to control a level of a first node Q1 in response to a first input signal STU1, for example, to charge the first node Q1. For example, the first input circuit 110 can be configured to receive the first input signal STU1 and a first voltage VDD, and the first input circuit 110 is turned on in response to the first input signal STU1, so that the first node Q1 can be charged with the first voltage VDD.

The first output circuit 120 is configured to output a shift signal CR and a first output signal OUT1 under the control of the level of the first node Q1. For example, the first output circuit 120 can be configured to receive a second clock signal CLKB and a third clock signal CLKC, when the first output circuit 120 is turned on under the control of the level of the first node Q1, the second clock signal CLKB can be output as the shift signal CR, and the third clock signal CLKC can be output as the first output signal OUT1.

For example, in the display period of one frame, the shift signal CR output by the first output circuit 120 can be supplied to other shift register units 10 as the first input signal STU1, thus completing the row-by-row shift of the display scanning; the first output signal OUT1 output by the first output circuit 120 can drive a certain row of sub-pixel units in the display panel to perform the display scanning. For another example, in the blanking period of one frame, the first output signal OUT1 output by the first output circuit 120 can be used to drive sensing transistors in a certain row of sub-pixel units in the display panel to complete the external compensation of the certain row of sub-pixel units.

It should be noted that in the display period of one frame, the signal waveforms of the shift signal CR and the first output signal OUT1 output by the first output circuit 120 can be the same or different, and are not limited by the embodiments of the present disclosure.

The second sub-unit 200 includes a second input circuit 210 and a second output circuit 220. The second input circuit 210 is configured to control a level of a second node Q2 in response to the first input signal STU1, such as charging the second node Q2. For example, the second input circuit 210 can be configured to receive the first input signal STU1 and the first voltage VDD, and the second input circuit 210 is turned on in response to the first input signal STU1, so that the second node Q2 can be charged with the first voltage VDD.

The second output circuit 220 is configured to output the second output signal OUT2 under the control of the level of the second node Q2. For example, the second output circuit 220 can be configured to receive a fourth clock signal CLKD, and the second output circuit 220 can output the fourth clock signal CLKD as the second output signal OUT2 when the second output circuit 220 is turned on under the control of the level of the second node Q2.

For example, during the display period of one frame, the second output signal OUT2 output by the second output circuit 220 can drive a certain row of sub-pixel units in the display panel to perform display scanning. For another example, in the blanking period of one frame, the second output signal OUT2 output by the second output circuit 220 can be used to drive sensing transistors in a certain row of sub-pixel units in the display panel to complete the external compensation of the row of sub-pixel units.

For example, when the plurality of shift register units 10 are cascaded to form a gate driving circuit, some of the plurality of shift register units 10 can be connected with a clock signal line to receive the first input signal STU1 provided by the clock signal line; alternatively, some of the plurality of shift register units 10 can also receive the shift signal CR output by the shift register units 10 of other stages as the first input signal STU1.

It should be noted that in the embodiments of the present disclosure, the first voltage VDD is at a high level, for example. The following embodiments are the same, and will not be repeated.

In addition, it should be noted that in the embodiments of the present disclosure, the high level and the low level are relative. The high level indicates a high voltage range (for example, the high level can use 5V, 10V, or other appropriate voltage), and a plurality of high levels can be the same or different. Similarly, the low level represents a low voltage range (for example, the low level can use 0V, −5V, −10V, or other appropriate voltages), and a plurality of low levels can be the same or different. For example, the minimum value of the high level is larger than the maximum value of the low level.

It should be noted that in the embodiments of the present disclosure, controlling a level of a node (such as the first node Q1, the second node Q2, etc.) includes charging the node to pull up the level of the node, or discharging the node to pull down the level of the node. For example, a capacitor electrically connected to the node can be provided, charging the node means charging the capacitor electrically connected to the node; similarly, discharging the node means discharging the capacitor electrically connected to the node; and the capacitor can maintain the high level or low level of the node.

The shift register 10 provided by the embodiments of the present disclosure can charge the plurality of sub-units (the first sub-unit 100 and the second sub-unit 200, etc.) at the same time. Only one sub-unit (such as the first sub-unit 100) needs to output the shift signal, while other sub-units (such as the second sub-unit 200, etc.) do not need to output the shift signal, which can save the number of clock signal lines and the number of transistors, thus reducing the frame size of the display device adopting the shift register unit 10, and improving the PPI of the display device.

It should be noted that FIG. 1B is only an example of the present disclosure. The embodiments of the present disclosure do not limit the number of sub-units included in the shift register unit 10. For example, the shift register unit 10 can also include three, four, or more sub-units, and the number of sub-units can be set according to actual situations.

Figure 2:
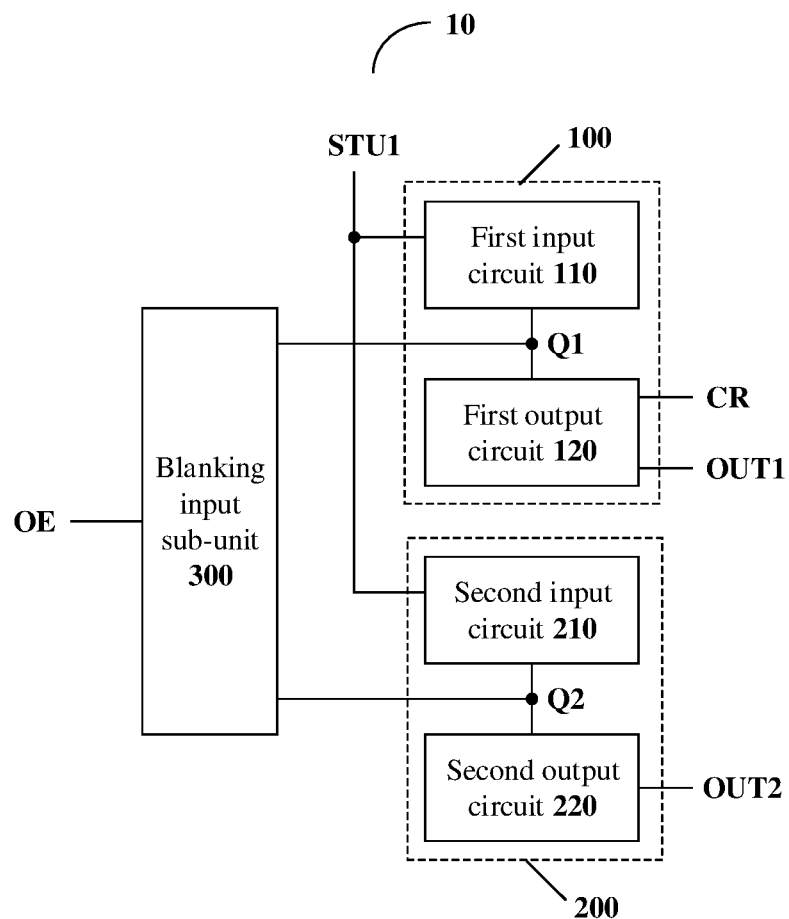
FIG. 2 is a schematic diagram of another shift register unit provided by an embodiment of the present disclosure.

As shown in FIG. 2, in an embodiment of the present disclosure, the shift register unit 10 also includes a blanking input sub-unit 300. The blanking input sub-unit 300 is connected with the first node Q1 and the second node Q2, and is configured to receive the selection control signal OE and control the level of the first node Q1 and the level of the second node Q2, for example, to charge the first node Q1 and the second node Q2.

For example, during the blanking period of one frame, the blanking input sub-unit 300 can charge the first node Q1 and the second node Q2, so that the first output circuit 120 outputs the first output signal OUT1 under the control of the level of the first node Q1, or the second output circuit 220 outputs the second output signal OUT2 under the control of the level of the second node Q2. The first output signal OUT1 or the second output signal OUT2 can be used to drive the sensing transistors in a certain row of sub-pixel units in the display panel to complete the external compensation of the row of sub-pixel units.

Figure 3:
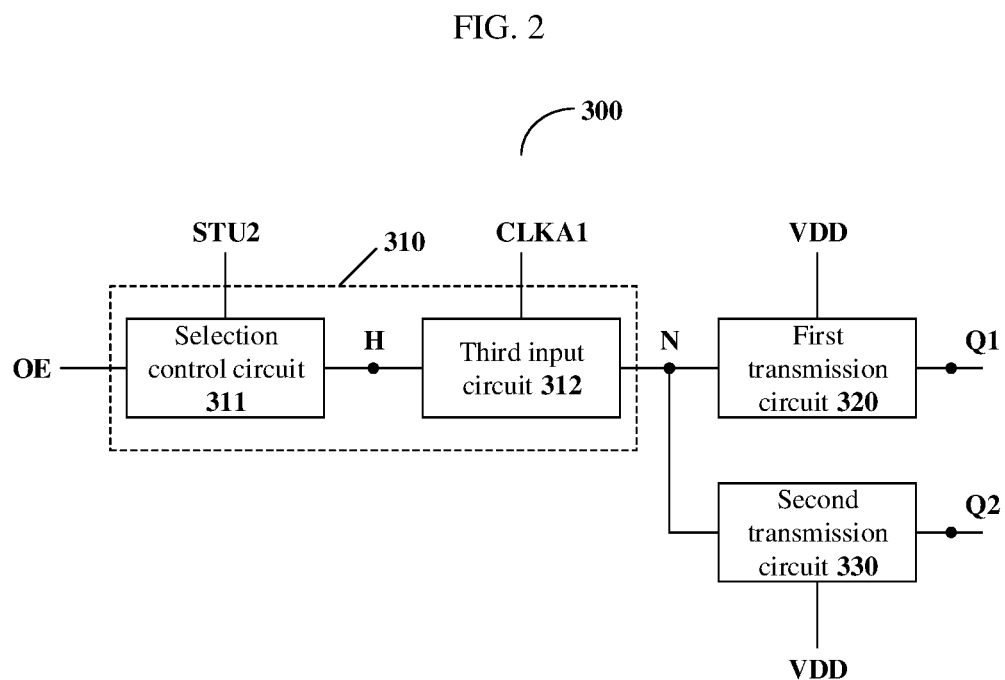
FIG. 3 is a schematic diagram of a blanking input sub-unit provided by an embodiment of the present disclosure.

As shown in FIG. 3, in an embodiment of the present disclosure, the blanking input sub-unit 300 includes a common input circuit 310, a first transmission circuit 320, and a second transmission circuit 330.

The common input circuit 310 is configured to control a level of a third node H in response to the selection control signal OE, and is configured to control a level of a fourth node N. For example, the common input circuit 310 includes a selection control circuit 311 and a third input circuit 312.

The selection control circuit 311 is configured to use the second input signal STU2 to control the level of the third node H in response to the selection control signal OE, for example, to charge the third node H, and to maintain the level of the third node H. For example, in the display period of one frame, the selection control circuit 311 can be turned on under the control of the selection control signal OE, so as to use the second input signal STU2 to charge the third node H. The level of the third node H (such as high level) can be maintained from the display period of a frame to the blanking period of the frame.

For example, when the plurality of shift register units 10 are cascaded to form a gate driving circuit, one stage shift register unit 10 can receive the shift signal CR output by the other stage shift register unit 10 as the second input signal STU2. For example, when it is necessary to select a stage shift register unit 10 to output a driving signal during the blanking period of a frame, the waveform timing of the selection control signal OE supplied to the stage shift register unit 10 and the waveform timing of the second input signal STU2 supplied to the stage shift register unit 10 can be made the same, so that the selection control circuit 311 in the stage shift register unit 10 is turned on.

The third input circuit 312 is configured to control a level of a fourth node N under the control of the level of the third node H. For example, the third input circuit 312 may be configured to receive the first clock sub-signal CLKA1. The third input circuit 312 is connected to the third node H, the fourth node N, and the first clock sub-signal line CLKA1. When the third input circuit 312 is turned on under the control of the level of the third node H, the third input circuit 312 can transmit the first clock sub-signal CLKA1 to the fourth node N, thereby controlling the level of the fourth node N. For example, during the blanking period of a frame, when the first clock sub-signal CLKA1 is at a high level, the third input circuit 312 can transmit the high level to the fourth node N, thereby causing the fourth node N to become high.

It should be noted that in the embodiments of the present disclosure, CLKA1 represents both the first clock sub-signal line and the first clock sub-signal, and CLKA2 represents both the second clock sub-signal line and the second clock sub-signal.

The first transmission circuit 320 is electrically connected to the first node Q1 and the fourth node N, and is configured to control the level of the first node Q1, such as charging the first node Q1, under the control of the level of the fourth node N or the first transmission signal TS1. For example, in some examples, the first transmission circuit 320 can receive a high-level first voltage VDD, and when the first transmission circuit 320 is turned on under the control of the level of the fourth node N, the first node Q1 can be charged using the first voltage VDD. For another example, in other examples, the first transmission circuit 320 can also be turned on under the control of the first transmission signal TS1, thereby achieving an electrical connection between the fourth node N and the first node Q1, and then the third input circuit 312 is used to charge the first node Q1.

The second transmission circuit 330 is electrically connected to the second node Q2 and the fourth node N, and is configured to control the level of the second node Q2, such as charging the second node Q2, under the control of the level of the fourth node N or the second transmission signal TS2. For example, in some examples, the second transmission circuit 330 can receive a high-level first voltage VDD, and when the second transmission circuit 330 is turned on under the control of the level of the fourth node N, the second node Q2 can be charged using the first voltage VDD. For another example, in other examples, the second transmission circuit 330 can also be turned on under the control of the second transmission signal TS2, thereby achieving an electrical connection between the fourth node N and the second node Q2, and then the third input circuit 312 is used to charge the second node Q2.

It should be noted that in the embodiments of the present disclosure, the first transmission signal TS1 and the second transmission signal TS2 can be the same, for example, using the second clock sub-signal CLKA2, which can save the number of the clock signal lines. By providing the first clock sub-signal line and the second clock sub-signal line that provide the same clock signal respectively, the voltage of the signal on the second clock sub-signal line connected with the gate electrode of the transistor will not be reduced due to the leakage of the clock signal on the first clock sub-signal line connected with the drain electrode of the transistor. The first transmission signal TS1 and the second transmission signal TS2 can also be different signals to control the first transmission circuit 320 and the second transmission circuit 330, respectively. For example, when it is not necessary to charge the second node Q2, the second transmission circuit 330 can be turned off, thereby reducing power consumption.

In addition, when the shift register unit 10 includes three, four, or more sub-units, accordingly, three, four, or more transmission circuits needs to be provided to implement the function of the blanking input sub-unit 300.

In the embodiments of the present disclosure, when the shift register unit 10 includes the plurality of sub-units (the first sub-unit 100, the second sub-unit 200, etc.), these sub-units can share a blanking input sub-unit 300, thereby reducing the area occupied by the shift register unit 10, reducing the frame size of the display device using the shift register unit, and improving the PPI of the display device.

It should be noted that in the embodiments of the present disclosure, the blanking input sub-unit 300 is set in the shift register unit to achieve to output a driving signal during a blanking period of one frame. The "blanking" in the blanking input sub-unit 300 only indicates that it is related to the blanking period in one frame, and does not limit the blanking input sub-unit 300 to only operate in the blanking period. The following embodiments are the same and will not be repeated.

As shown in FIGS. 4 and 5A-5D, in some embodiments, the selection control circuit 311 can be implemented to include a first transistor M1 and a first capacitor C1. A gate electrode of the first transistor M1 is configured to receive the selection control signal OE, a first electrode of the first transistor M1 is configured to receive the second input signal STU2, and a second electrode of the first transistor M1 is connected to the third node H. For example, when the selection control signal OE is a high level conduction signal, the first transistor M1 is turned on, so that the third node H can be charged using the second input signal STU2.

A first electrode of the first capacitor C1 is connected to the third node H, and a second electrode of the first capacitor C1 is configured to receive the fourth voltage VGL1 or the first voltage VDD. By setting the first capacitor C1, the potential of the third node H can be maintained. For example, during the display period of a frame, the selection control circuit 311 charges the third node H to raise the third node H to a high potential. The first capacitor C1 can maintain the high potential of the third node H until the blanking period of the frame. In addition, in other embodiments, the second electrode of the first capacitor C1 can also be connected to the fourth node N.

It should be noted that in the embodiments of the present disclosure, the fourth voltage VGL1 is for example at a low level. The following embodiments are the same and will not be repeated.

Figure 4:
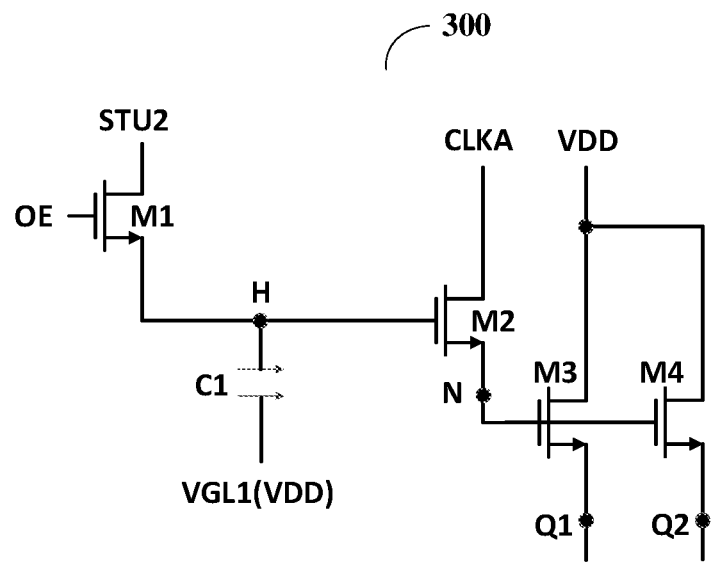
FIG. 4 is a circuit diagram of a blanking input sub-unit provided by an embodiment of the present disclosure.

For example, in the embodiment shown in FIG. 4, the third input circuit 312 can be implemented as a second transistor M2. A gate electrode of the second transistor M2 is connected to the third node H, a first electrode of the second transistor M2 is configured to receive the first clock sub-signal CLKA1, and a second electrode of the second transistor M2 is connected to the fourth node N. For example, when the third node H is at a high level, the second transistor M2 is turned on, thereby transmitting the first clock sub-signal CLKA1 to the fourth node N to raise the level of the fourth node N.

The distance between the gate electrode and the drain electrode of the second transistor M2 in the existing shift register is 3.5 microns, which is relatively close. Therefore, when the first clock sub-signal CLKA1 jumps, the node H of the non-sensing row will be coupled by the capacitor Cgd between the gate electrode and the drain electrode of the second transistor M2, resulting in leakage of the node H.

In the embodiments of the present disclosure, for example, the distance between the orthographic projection of the gate electrode of the second transistor M2 on the base substrate and the orthographic projection of the first electrode of the second transistor M2 on the base substrate is greater than 3 microns, such as 6 microns. The embodiment of the present disclosure greatly reduces the capacitor Cgd between the gate electrode and the drain electrode of the second transistor M2 by setting the distance between the gate electrode and the drain electrode of the second transistor M2 to 6 microns, thus reducing the coupling of the node H of the non-sensing row and reducing leakage. In addition, it is also possible to increase the capacitor C1, according to $\Delta Vh=(Cgd/(C1+Cgd))*\Delta Vclka1$ (where $\Delta Vh$ refers to the change in the voltage at the node H, and $\Delta Vclka$ refers to the change in the voltage of the first clock sub-signal CLKA1), increasing the capacitor C1 can reduce the coupling at the node H.

For example, in the embodiment shown in FIG. 4, the first transmission circuit 320 includes a third transistor M3, and the second transmission circuit 330 includes a fourth transistor M4.

A gate electrode of the third transistor M3 is connected to the fourth node N, a first electrode of the third transistor M3 is configured to receive the first voltage VDD, and a second electrode of the third transistor M3 is connected to the first node Q1. For example, when the fourth node N is at a high level, the third transistor M3 is turned on, so that the first node Q1 can be charged using the first voltage VDD having a high level.

A gate electrode of the fourth transistor M4 is connected to the fourth node N, a first electrode of the fourth transistor M4 is configured to receive the first voltage VDD, and a second electrode of the fourth transistor M4 is connected to the second node Q2. For example, when the fourth node N is at a high level, the fourth transistor M4 is turned on, so that the second node Q2 can be charged using the first voltage VDD having a high level.

The blanking input sub-unit 300 provided in FIGS. 5A-5F is described below. It should be noted that in the following description, the parts of FIGS. 5A-5F are the same as those of the FIG. 4 will not be described again.

Figure 5A:
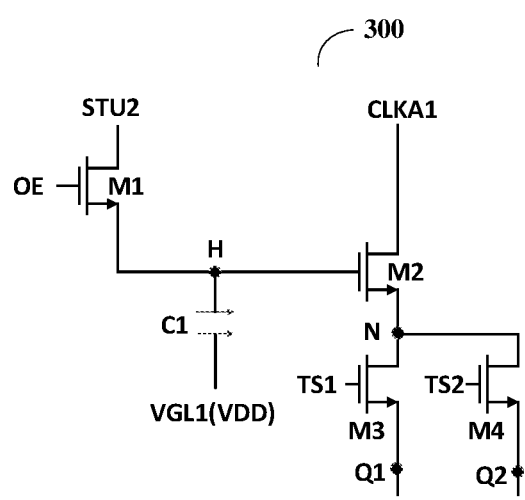
FIGS. 5A to 5D are circuit diagrams of four blanking input sub-units provided by an embodiment of the present disclosure.

For example, in the blanking input sub-unit 300 provided in FIG. 5A, the first electrode of the second transistor M2 is configured to receive the first clock sub-signal CLKA1; the gate electrode of the third transistor M3 is configured to receive the first transmission signal TS1, and the first electrode of the third transistor M3 is connected to the fourth node N; the gate electrode of the fourth transistor M4 is configured to receive the second transmission signal TS2, and the first electrode of the fourth transistor M4 is connected to the fourth node N. For example, during the blanking period of a frame, when it is necessary to charge the first node Q1, the first transmission signal TS1 can be made to be at a high level, thereby making the third transistor M3 be turned on. The first clock sub-signal CLKA1 can charge the first node Q1 through the second transistor M2 and the third transistor M3. For another example, during the blanking period of a frame, when it is necessary to charge the second node Q2, the second transmission signal TS2 can be made to be at a high level, thereby making the fourth transistor M4 be turned on, and the first clock sub-signal CLKA1 can charge the second node Q2 through the second transistor M2 and the fourth transistor M4.

Figure 5B:
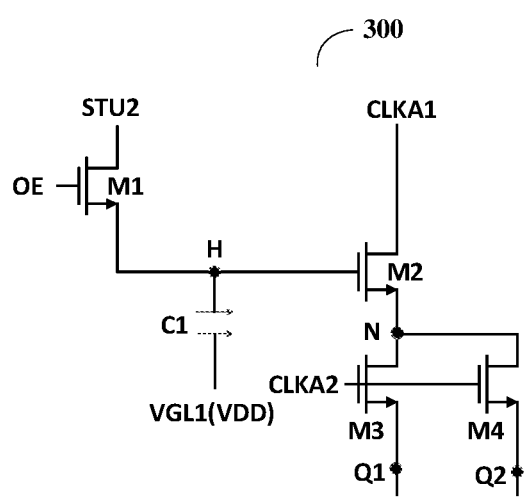

For example, in the blanking input sub-unit 300 provided in FIG. 5B, the gate electrodes of the third transistor M3 and the fourth transistor M4 are both configured to receive the second clock sub-signal CLKA2. For example, during the blanking period of a frame, when the second clock sub-signal CLKA2 is at a high level, the third transistor M3 and the fourth transistor M4 are turned on simultaneously, and the first clock sub-signal CLKA1 can simultaneously charge the first node Q1 and the second node Q2.

Compared to FIG. 4, the first electrodes of the third transistor M3 and the fourth transistor M4 in FIGS. 5A and 5B are both connected to the fourth node N, that is, the first electrodes of the third transistor M3 and the fourth transistor M4 in FIGS. 5A and 5B indirectly receive the first clock sub-signal CLKA1 instead of always receiving a high level first voltage VDD, thus reducing the time when the first electrodes of the third transistor M3 and the fourth transistor M4 are applied with a high level, thereby extending the service life of the third transistor M3 and the fourth transistor M4, and ensuring the stability of the shift register unit 10.

Figure 5C:
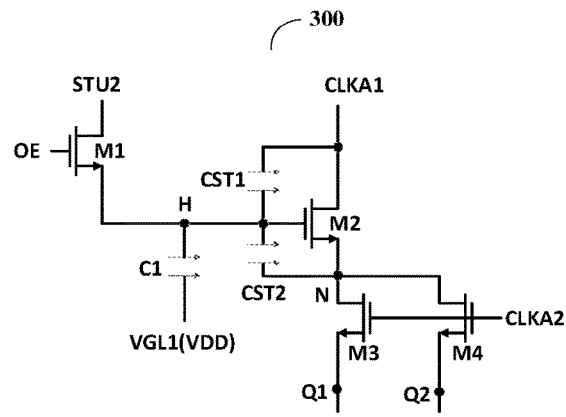

For example, as shown in FIG. 5C, the blanking input sub-unit 300 also includes a first coupling capacitor CST1. A first electrode of the first coupling capacitor CST1 is configured to receive the first clock signal CLKA, and a second electrode of the first coupling capacitor CST1 is connected to the third node H. For example, when the first clock signal CLKA changes from a low level to a high level, the first clock signal CLKA can couple and pull up the third node H through the coupling effect of the first coupling capacitor CST1, making the level of the third node H further pulled up, thereby ensuring that the second transistor M2 is turned on more sufficiently.

For example, as shown in FIG. 5C, the blanking input sub-unit 300 also includes a second coupling capacitor CST2, a first electrode of the second coupling capacitor CST2 is connected to the third node H, and a second electrode of the second coupling capacitor CST2 is connected to the fourth node N. For example, when the first clock signal CLKA changes from a low level to a high level, at this time, if the second transistor M2 is turned on, the high level first clock signal CLKA can be transmitted to the fourth node N through the second transistor M2, causing the potential of the second electrode of the second coupling capacitor CST2 to be pulled up, and through the bootstrap action, the level of the third node H can be further pulled up, thereby ensuring that the second transistor M2 is turned on more sufficiently.

Figure 5D:
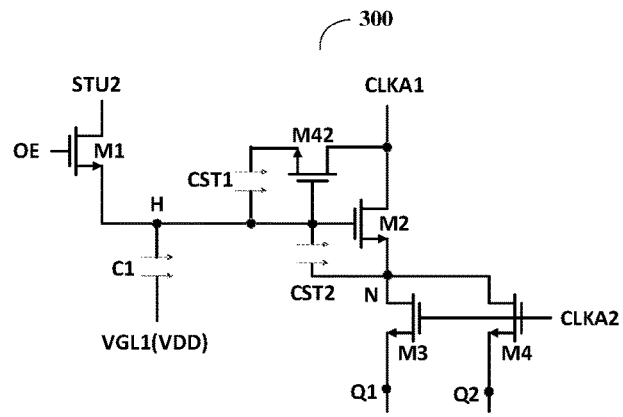

For example, as shown in FIG. 5D, the blanking input sub-unit 300 also includes a forty-second transistor M42. A gate electrode of the forty-second transistor M42 is connected to the third node H, a first electrode of the forty-second transistor M42 is configured to receive the first clock sub-signal CLKA1, and a second electrode of the forty-second transistor M42 is connected to the first electrode of the first coupling capacitor CST1. For example, when the third node His at a high level, the forty-second transistor M42 is turned on, and the first clock sub-signal CLKA1 can couple and pull up the third node H through the coupling effect of the first coupling capacitor CST1, making the level of the third node H further pulled up, thereby ensuring that the second transistor M2 is turned on more sufficiently.

For example, FIG. 6 also provides a blanking input sub-unit 300. Compared to FIG. 5D, the blanking input sub-unit 300 also includes a forty-third transistor M43 and a ninth leakage prevention transistor M1_b, a tenth leakage prevention transistor M3_b, as well as a eleventh leakage prevention transistor M4_b.

As shown in FIG. 6, a gate electrode of the forty-third transistor M43 is connected to the third node H, a first electrode of the forty-third transistor M43 is configured to receive a sixth voltage VB, and a second electrode of the forty-third transistor M43 is connected to the second electrode of the first transistor M1; a gate electrode of the ninth leakage prevention transistor M1_b is configured to receive the selection control signal OE, a first electrode of the ninth leakage prevention transistor M1_b is connected to the second electrode of the first transistor M1, and a second electrode of the ninth leakage prevention transistor M1_b is connected to the third node H; gate electrodes of the tenth leakage prevention transistors M3_b and M4_b are configured to receive the second clock sub-signal CLKA2, first electrodes of the tenth leakage prevention transistors M3_b and M4_b are connected to a seven node OF, a second electrode of the tenth leakage prevention transistor M3_b is connected to the first node Q1, and a second electrode of the eleventh leakage prevention transistor M4_b is connected to the second node Q1.

The combination of the forty-third transistor M43 and the ninth leakage prevention transistor M1_b can prevent leakage at the third node H, the tenth leakage prevention transistor M3_b can prevent leakage at the first node Q1, and the eleventh leakage prevention transistor M4_b can prevent leakage at the second node Q2. The working principle of leakage prevention of electricity in FIG. 6 and the seventh node OF will be described in detail below, and will not be discussed here.

In the above embodiment of the present disclosure, for example, by connecting the first electrode of the second transistor M2 with the first clock sub-signal line CLKA1, the gate electrode of the third transistor M3, the gate electrode of the fourth transistor M4, and/or the gate electrodes of the tenth leakage prevention transistor M3_b and the eleventh leakage prevention transistor M4_b can be connected with the second clock sub-signal line CLKA2, that is, although the gate electrode and the drain electrode of the transistor receive the same signal, the same signal is provided to the gate electrode and the drain electrode of the transistor separately through two signal lines CLKA1 and CLKA2, thereby avoiding the influence on the second clock sub-signal CLKA2 when the voltage of the first clock sub-signal CLKA1 provided by the first clock sub-signal line CLKA1 decreases due to the leakage of the second transistor M4, thereby ensuring that the third transistor M3, the fourth transistor M4, and/or the tenth and eleventh leakage prevention transistors M3_b and M4_b operate normally under the control of the second clock sub-signal CLKA2, thus avoiding the problem that the gate driving circuit cannot output the random compensation signal caused by the insufficient voltage of the gate electrode of the transistor due to the leakage of the same signal connected to the gate electrode of the transistor because of the leakage of the signal of the drain electrode of the transistor when the signal is supplied to the drain electrode and the gate electrode of the transistor through the same signal line (that is, when the first clock sub-signal line and the second clock sub-signal are the same signal line), so as to avoid the problem that the node Q1 and the node Q2 cannot be raised when the threshold voltage is biased to positive, and ensure effective compensation for the display panel.

It should be noted that in the embodiments of the present disclosure, the sixth voltage VB is for example at a high level. The following embodiments are the same and will not be repeated.

In addition, it should be noted that the transistors in the blanking input sub-unit 300 provided in FIGS. 4, 5A-5D, and 6A-6B are illustrated using N-type transistors as an example.

Figure 7:
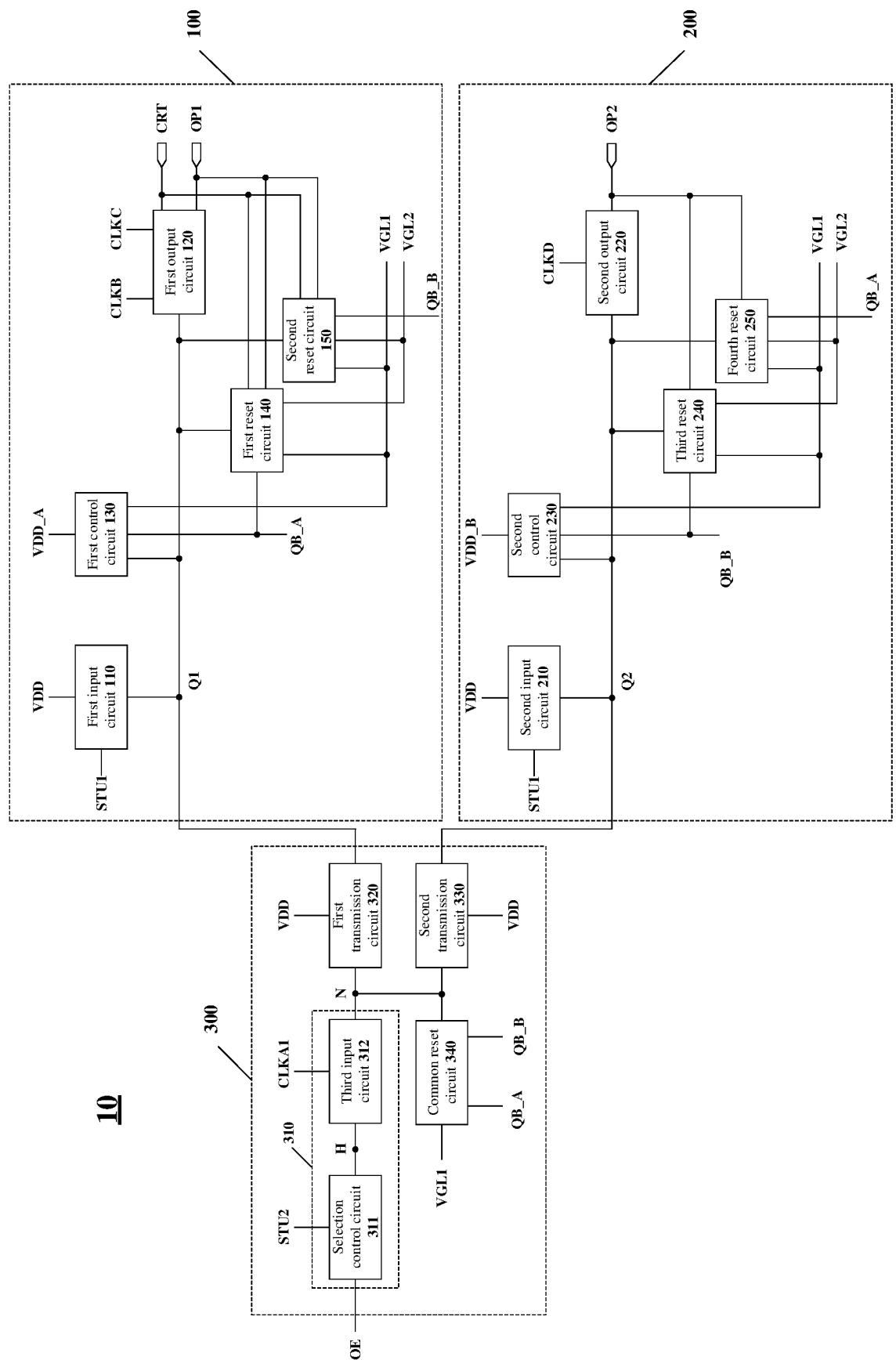
FIG. 7 is a schematic diagram of still another shift register unit provided by an embodiment of the present disclosure.

An embodiment of the present disclosure also provides a shift register unit 10, as shown in FIG. 7, the first sub-unit 100 also includes a first control circuit 130, a first reset circuit 140, a second reset circuit 150, a shift signal output terminal CRT, and a first output signal terminal OP1. The shift signal output terminal CRT is configured to output the shift signal CR, and the first output signal terminal OP1 is configured to output the first output signal OUT1.

The first control circuit 130 is configured to control the level of the fifth node QB_A under the control of the level of the first node Q1 and the second voltage VDD_A. For example, the first control circuit 130 is connected to the first node Q1 and the fifth node QB_A, and is configured to receive the second voltage VDD_A and the fourth voltage VGL1. For example, when the first node Q1 is at a high level, the first control circuit 130 can use the low level fourth voltage VGL1 to pull the fifth node QB_A down to a low level. For another example, when the potential of the first node Q1 is at a low level, the first control circuit 130 can use the second voltage VDD_A (for example, a high level) to charge the fifth node QB_A to pull the fifth node QB_A up to a high level.

The first reset circuit 140 is configured to reset the first node Q1, the shift signal output terminal CRT, and the first output signal terminal OP1 under the control of the level of the fifth node QB_A. For example, the first reset circuit 140 is connected to the first node Q1, the fifth node QB_A, the shift signal output terminal CRT, and the first output signal terminal OP1, and is configured to receive the fourth voltage VGL1 and the fifth voltage VGL2. For example, when the first reset circuit 140 is turned on under the control of the level of the fifth node QB_A, the fourth voltage VGL1 can be used to perform a pull-down reset on the first node Q1 and the shift signal output terminal CRT, and the fifth voltage VGL2 can also be used to perform a pull-down reset on the first output signal terminal OP1. It should be noted that in the embodiments of the present disclosure, the fourth voltage VGL1 can also be used to perform a pull-down reset on the first output signal terminal OP1, and the present disclosure does not limit this. In addition, in the embodiments of the present disclosure, the fifth voltage VGL2 is for example at a low level. The following embodiments are the same and will not be repeated. In the embodiments of the present disclosure, the fifth voltage VGL2 can be the same as or different from the fourth voltage VGL1.

The second reset circuit 150 is configured to reset the first node Q1, the shift signal output terminal CRT, and the first output signal terminal OP1 under the control of the level of the sixth node QB_B. For example, the second reset circuit 150 is connected to the first node Q1, the sixth node QB_B, the shift signal output terminal CRT, and the first output signal terminal OP1, and is configured to receive the fourth voltage VGL1 and the fifth voltage VGL2. For example, when the second reset circuit 150 is turned on under the control of the level of the sixth node QB_B, the fourth voltage VGL1 can be used to perform a pull-down reset on the first node Q1 and the shift signal output terminal CRT, and the fifth voltage VGL2 can also be used to perform a pull-down reset on the first output signal terminal OP1.

As shown in FIG. 7, the second sub-unit 200 further includes a second control circuit 230, a third reset circuit 240, a fourth reset circuit 250, and a second output signal terminal OP2. The second output signal terminal OP2 is configured to output the second output signal OUT2.

The second control circuit 230 is configured to control the level of the sixth node QB_B under the control of the level of the second node Q2 and the third voltage VDD_B. For example, the second control circuit 230 is connected to the second node Q2 and the sixth node QB_B, and is configured to receive the third voltage VDD_B and the fourth voltage VGL1. For example, when the second node Q2 is at a high level, the second control circuit 230 can use the low level fourth voltage VGL1 to pull down the sixth node QB_B to a low level. For another example, when the potential of the second node Q2 is at a low level, the second control circuit 230 can charge the sixth node QB_B using the third voltage VDD_B (for example, a high level) to pull the sixth node QB_B up to a high level.

The third reset circuit 240 is configured to reset the second node Q2 and the second output signal terminal OP2 under the control of the level of the sixth node QB_B. For example, the third reset circuit 240 is connected to the second node Q2, the sixth node QB_B, and the second output signal terminal OP2, and is configured to receive the fourth voltage VGL1 and the fifth voltage VGL2. For example, when the third reset circuit 240 is turned on under the control of the level of the sixth node QB_B, the fourth voltage VGL1 can be used to perform a pull-down reset on the second node Q2, and the fifth voltage VGL2 can also be used to perform a pull-down reset on the second output signal terminal OP2. It should be noted that in the embodiments of the present disclosure, the fourth voltage VGL1 can also be used to perform a pull-down reset on the second output signal terminal OP2, and the present disclosure does not limit this.

The fourth reset circuit 250 is configured to reset the second node Q2 and the second output signal terminal OP2 under the control of the level of the fifth node QB_A. For example, the fourth reset circuit 250 is connected to the second node Q2, the fifth node QB_A, and the second output signal terminal OP2, and is configured to receive the fourth voltage VGL1 and the fifth voltage VGL2. For example, when the fourth reset circuit 250 is turned on under the control of the level of the fifth node QB_A, the fourth voltage VGL1 can be used to perform a pull-down reset on the second node Q2, and the fifth voltage VGL2 can also be used to perform a pull-down reset on the second output signal terminal OP2.

It should be noted that in the embodiments of the present disclosure, for example, the second voltage VDD_A and the third voltage VDD_B can be configured to be mutually inverted signals, that is, if the second voltage VDD_A is at a high level, the third voltage VDD_B is at a low level, while if the second voltage VDD_A is at a low level, the third voltage VDD_B is at a high level. In this way, only one of the first control circuit 130 and the second control circuit 230 can be in the operation state at the same time, which can avoid performance drift caused by long-term operation of the circuit, thereby improving the stability of the circuit.

As shown in FIG. 7, the blanking input sub-unit 300 also includes a common reset circuit 340, and the common reset circuit 340 is electrically connected to the fourth node N, the fifth node QB_A, and the sixth node QB_B, and is configured to reset the fourth node N under the control of the level of the fifth node QB_A or the sixth node QB_B. For example, the common reset circuit 340 can be configured to receive the fourth voltage VGL1. When the common reset circuit 340 is turned on under the control of the level of the fifth node QB_A or the sixth node QB_B, the fourth voltage VGL1 can be used to perform pull-down reset on the fourth node N.

In the embodiments of the present disclosure, the level of the fourth node N can be better controlled by setting the common reset circuit 340. For example, when the first node Q1 or the second node Q2 does not require to be charged, making the fourth node N at a low level, turning off the first transmission circuit 320 and the second transmission circuit 330, thereby avoiding charging the first node Q1 or the second node Q2 with a high level first voltage VDD and avoiding abnormal output, thereby improving the stability of the circuit.

It should be noted that in the embodiments of the present disclosure, each node (the first node Q1, the second node Q2, the third node H, the fourth node N, the fifth node QB_A, and the sixth node QB_B, etc.) and each output terminal (the shift signal output terminal CRT, the first output signal terminal OP1, and the second output signal terminal OP2, etc.) are set to better describe the circuit structure, and are not intended to represent actual components. A node represents a junction point of related circuit connections in the circuit structure, that is, related circuits connected to the node with the same node identification connection are electrically connected to each other. For example, as shown in FIG. 7, the first control circuit 130, the first reset circuit 140, the fourth reset circuit 250, and the common reset circuit 340 are all connected to the fifth node QB_A, which means that these circuits are electrically connected to each other.

Figure 8:
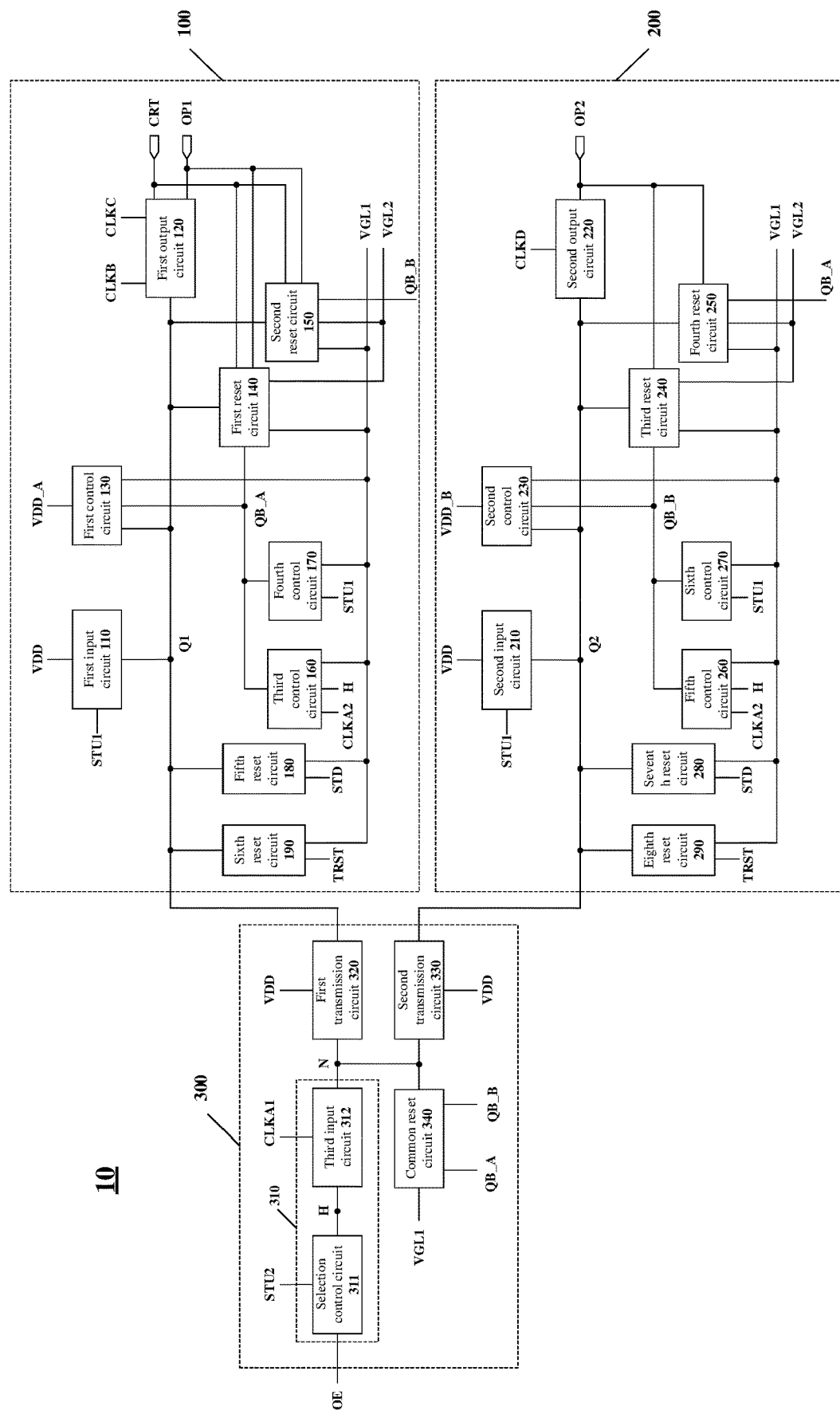
FIG. 8 is a schematic diagram of yet another shift register unit provided by an embodiment of the present disclosure.

An embodiment of the present disclosure also provides a shift register unit 10, as shown in FIG. 8, in the shift register unit 10, the first sub-unit 100 also includes a third control circuit 160 and a fourth control circuit 170, the third control circuit 160 is connected to the second clock sub-signal line CLKA2 and the fifth node QB_A, and is configured to control the level of the fifth node QB_A in response to the second clock sub-signal CLKA2 provided by the second clock sub-signal line CLKA2. The fourth control circuit 170 is configured to control the level of the fifth node QB_A in response to the first input signal STU1.

For example, in one example, the third control circuit 160 is connected to the second clock sub-signal line CLKA2 and the fifth node QB_A, and is configured to receive the second clock sub-signal CLKA2 provided by the second clock sub-signal line CLKA2 and the fourth voltage VGL1. For example, during the blanking period of a frame, the third control circuit 160 can be turned on in response to the second clock sub-signal CLKA2, thereby utilizing a low level fourth voltage VGL1 to pull down the fifth node QB_A. For another example, in another example, the third control circuit 160 is also connected to the third node H. For example, during the blanking period of a frame, when the third node H is at a high level and the second clock sub-signal CLKA2 is at a high level, the third control circuit 160 is turned on, so that the fourth voltage VGL1 at a low level can be used to pull down the fifth node QB_A.

For example, the fourth control circuit 170 is connected to the fifth node QB_A and is configured to receive the first input signal STU1 and the fourth voltage VGL1. For example, during the display period of a frame, the fourth control circuit 170 is turned on in response to the first input signal STU1, thereby utilizing a low level fourth voltage VGL1 to pull down the fifth node QB_A. Pulling down the fifth node QB_A to a low potential can avoid the influence of the fifth node QB_A on the first node Q1, thereby making the charging of the first node Q1 more sufficient during the display period.

As shown in FIG. 8, the second sub-unit 200 also includes a fifth control circuit 260 and a sixth control circuit 270, the fifth control circuit 260 is connected to the second clock sub-signal line CLKA2 and the sixth node QB_B, and is configured to control the level of the sixth node QB_B in response to the second clock sub-signal CLKA2 provided by the second clock sub-signal line CLKA2. The sixth control circuit 270 is configured to control the level of the sixth node QB_B in response to the first input signal STU1.

For example, in one example, the fifth control circuit 260 is connected to the second clock sub-signal line CLKA2 and the sixth node QB_B, and is configured to receive the second clock sub-signal CLKA2 and the fourth voltage VGL1. For example, during the blanking period of a frame, the fifth control circuit 260 may be turned on in response to the second clock sub-signal CLKA2, thereby utilizing a low level fourth voltage VGL1 to pull down the sixth node QB_B. For another example, in another example, the fifth control circuit 260 is also connected to the third node H. For example, during the blanking period of a frame, when the third node H is at a high level and the second clock sub-signal CLKA2 is at a high level, the fifth control circuit 260 is turned on, so that the fourth voltage VGL1 at a low level can be used to pull down the sixth node QB_B.

For example, the sixth control circuit 270 is connected to the sixth node QB_B and is configured to receive the first input signal STU1 and the fourth voltage VGL1. For example, during the display period of a frame, the sixth control circuit 270 is turned on in response to the first input signal STU1, thereby utilizing a low level fourth voltage VGL1 to pull down the sixth node QB_B. Pulling down the sixth node QB_B to a low potential can avoid the influence of the sixth node QB_B on the second node Q2, thereby making the charging of the second node Q2 more sufficient during the display period.

As shown in FIG. 8, the first sub-unit 100 also includes a fifth reset circuit 180 and a sixth reset circuit 190, the fifth reset circuit 180 is configured to reset the first node Q1 in response to a display reset signal STD, and the sixth reset circuit 190 is configured to reset the first node Q1 in response to a global reset signal TRST.

For example, the fifth reset circuit 180 is connected to the first node Q1 and is configured to receive the display reset signal STD and the fourth voltage VGL1. For example, during the display period of a frame, the fifth reset circuit 180 is turned on in response to the display reset signal STD, therefore, the fourth voltage VGL1 can be used to perform a pull-down reset on the first node Q1. For example, when the plurality of shift register units 10 are cascaded to form the gate driving circuit, one stage shift register unit 10 can receive the shift signal CR output by the other stage shift register unit 10 as the display reset signal STD.

For example, the sixth reset circuit 190 is connected to the first node Q1 and is configured to receive the global reset signal TRST and the fourth voltage VGL1. For example, when the plurality of shift register units 10 are cascaded to form the gate driving circuit, before the display period of a frame, the sixth reset circuit 190 in the shift register unit 10 at each stage is turned on in response to the global reset signal TRST, therefore, a low level fourth voltage VGL1 can be used to perform a pull-down reset on the first node Q1, thereby achieving a global reset of the gate driving circuit.

As shown in FIG. 8, the second sub-unit 200 also includes a seventh reset circuit 280 and an eighth reset circuit 290. The seventh reset circuit 280 is configured to reset the second node Q2 in response to the display reset signal STD, and the eighth reset circuit 290 is configured to reset the second node Q2 in response to the global reset signal TRST.

For example, the seventh reset circuit 280 is connected to the second node Q2 and is configured to receive the display reset signal STD and the fourth voltage VGL1. For example, during the display period of a frame, the seventh reset circuit 280 is turned on in response to the display reset signal STD, and therefore, the fourth voltage VGL1 can be used to perform a pull-down reset on the second node Q2.

For example, the eighth reset circuit 290 is connected to the second node Q2 and is configured to receive the global reset signal TRST and the fourth voltage VGL1. For example, when the plurality of shift register units 10 are cascaded to form the gate driving circuit, before the display period of a frame, the eighth reset circuit 290 in the shift register unit 10 at each stage is turned on in response to the global reset signal TRST, so that the fourth voltage VGL1 can be used to perform a pull-down reset on the second node Q2, thereby achieving a global reset of the gate driving circuit.

Those skilled in the art can understand that although a plurality of control circuits and a plurality of reset circuits are shown in FIG. 8, the above examples do not limit the scope of protection of the present disclosure. In practical applications, technicians can select to use or not to use one or more of the above circuits according to the situation. Various combinations and variations based on the aforementioned circuits do not depart from the principles of the present disclosure, and will not be described in detail.

Figure 9A:
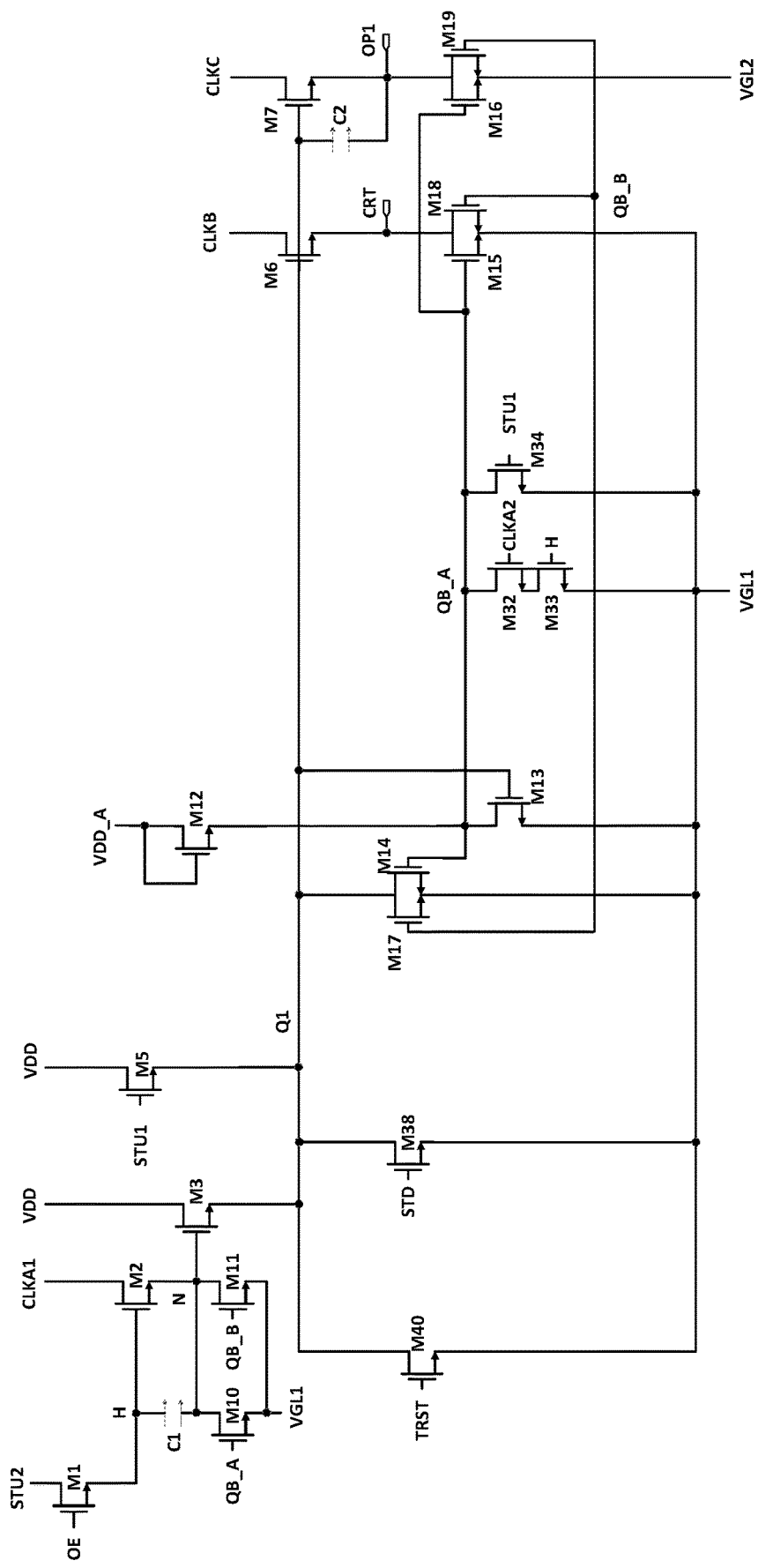
FIGS. 9A and 9B are circuit diagrams of a shift register unit provided by an embodiment of the present disclosure.
Figure 9B:
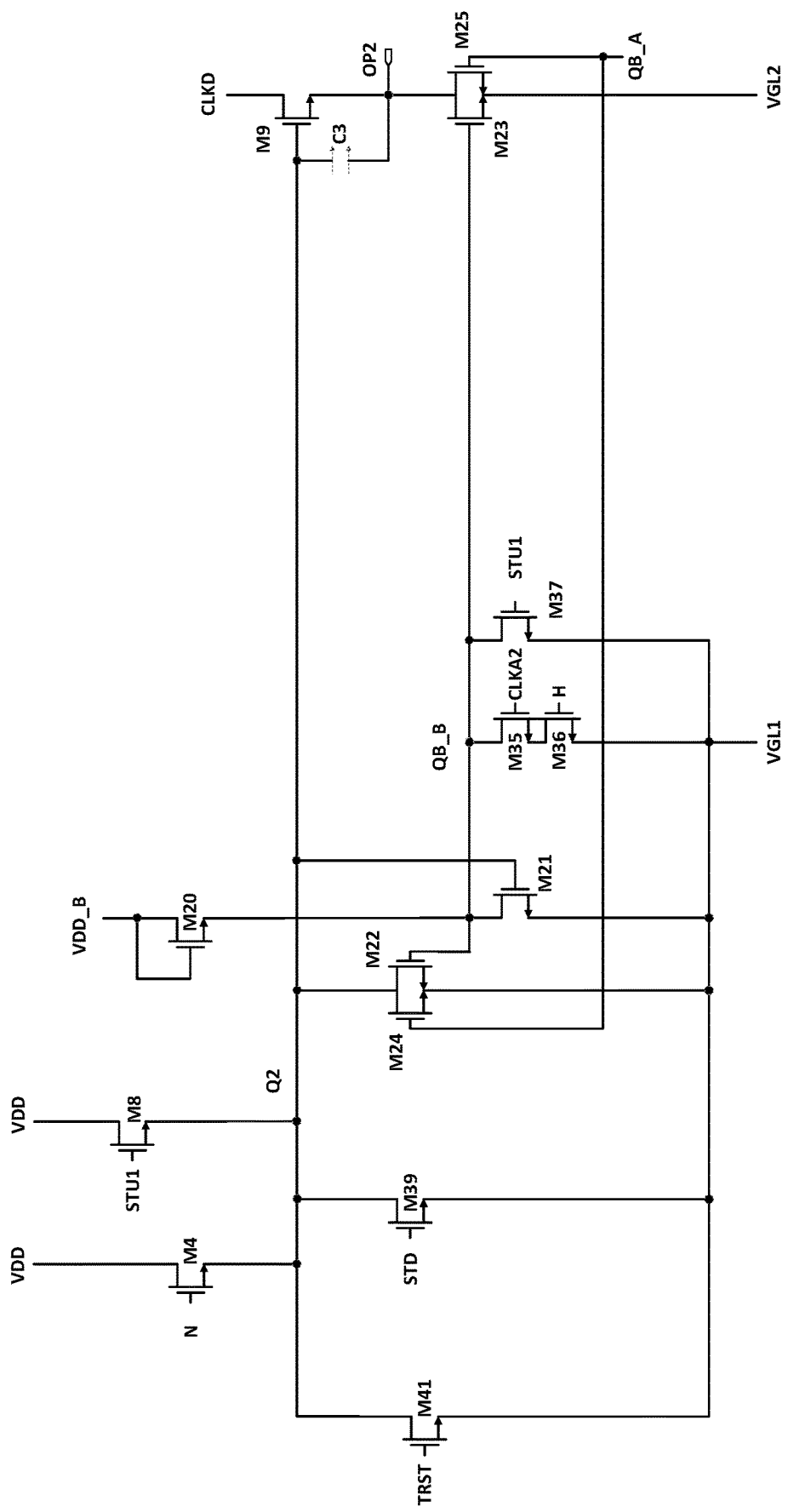

In an embodiment of the present disclosure, the shift register unit 10 shown in FIG. 8 can be implemented as the circuit structures shown in FIGS. 9A and 9B. It should be noted that for clarity, FIG. 9A shows the first sub-unit 100 in the shift register unit 10 and a portion of the blanking input sub-unit 300 in the shift register unit 10 except for the second transmission circuit 330, FIG. 9B shows the second sub-unit 200 and the second transmission circuit 330 in the shift register unit 10. The circuits in FIGS. 9A and 9B are electrically connected through corresponding nodes. The schematic mode of the circuit structures of the shift register unit 10 in the following embodiments is the same and will not be repeated.

As shown in FIGS. 9A and 9B, the shift register unit 10 includes a first transistor M1 to a forty first transistor M41, a first capacitor C1, a second capacitor C2, and a third capacitor C3. It should be noted that the transistors shown in FIGS. 9A and 9B are illustrated using N-type transistors as examples, and the portion of the blanking input sub-unit 300 that has been described above will not be described again.

As shown in FIG. 9A, the first input circuit 110 can be implemented as a fifth transistor M5. A gate electrode of the fifth transistor M5 is configured to receive the first input signal STU1, a first electrode of the fifth transistor M5 is configured to receive the first voltage VDD, and a second electrode of the fifth transistor M5 is connected to the first node Q1.

Figure 10A:
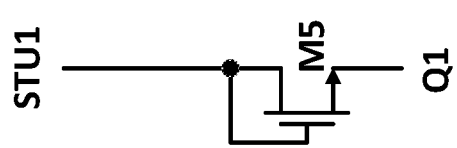
FIGS. 10A to 10C are circuit diagrams of three first input circuits provided by the embodiment of the present disclosure.

For example, in another example, as shown in FIG. 10A, the gate electrode and the first electrode of the fifth transistor M5 are connected and are configured to receive the first input signal STU1, so that when the first input signal STU1 is at a high level, the first node Q1 is charged using the first input signal STU1 having a high level.

Figure 10B:
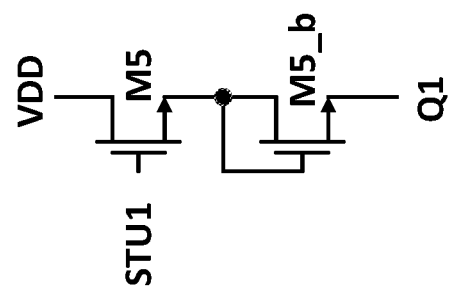

For example, in another example, as shown in FIG. 10B, the first input circuit 110 further includes a transistor M5_b. A gate electrode and a first electrode of transistor M5_b are connected to the second electrode of fifth transistor M5, and a second electrode of transistor M5_b is connected to the first node Q1. Because the transistor M5_b adopts the diode connection mode, a current can only flow from the first electrode of the transistor M5_b to the second electrode of the transistor M5_b and cannot flow from the second electrode of the transistor M5_b (i.e., the first node Q1) to the first electrode of the transistor M5_b, thereby avoiding leakage of electricity of the first node Q1 through the fifth transistor M5.

Figure 10C:
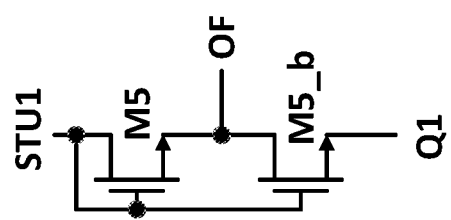

For example, in another example, as shown in FIG. 10C, the gate electrode of the transistor M5_b and the gate electrode of the fifth transistor M5 are connected to each other, and both are configured to receive the first input signal STU1, and the first electrode of transistor M5_b is connected to the seventh node OF. The first input circuit 110 shown in FIG. 10C adopts a leakage prevention structure to avoid leakage at the first node Q1. It should be noted that the working principle of leakage prevention and the seventh node OF will be described below, and will not be repeated here.

As shown in FIG. 9A, the first output circuit 120 can be implemented to include a sixth transistor M6, a seventh transistor M7, and a second capacitor C2. A gate electrode of the sixth transistor M6 is connected to the first node Q1, a first electrode of the sixth transistor M6 is configured to receive the second clock signal CLKB to act as the shift signal CR, and a second electrode of the sixth transistor M6 is connected to the shift signal output terminal CRT and is configured to output the shift signal CR.

A gate electrode of the seventh transistor M7 is connected to the first node Q1, a first electrode of the seventh transistor M7 is configured to receive the third clock signal CLKC to act as the first output signal OUT1, and a second electrode of the seventh transistor M7 is connected to the first output signal terminal OP1 and is configured to output the first output signal OUT1. A first electrode of the second capacitor C2 is connected to the first node Q1, and a second electrode of the second capacitor C2 is connected to the second electrode of the seventh transistor M7 (i.e., the first output signal terminal OP1).

As shown in FIG. 9B, the second input circuit 210 can be implemented as an eighth transistor M8. A gate electrode of the eighth transistor M8 is configured to receive the first input signal STU1, a first electrode of the eighth transistor M8 is configured to receive the first voltage VDD, and a second electrode of the eighth transistor M8 is connected to the second node Q2. It should be noted that the second input circuit 210 can also use a circuit structure similar to that shown in FIGS. 10A-10C, which will not be discussed here.

As shown in FIG. 9B, the second output circuit 220 can be implemented to include a ninth transistor M9 and a third capacitor C3. A gate electrode of the ninth transistor M9 is connected to the second node Q2, a first electrode of the ninth transistor M9 is configured to receive the fourth clock signal CLKD to act as the second output signal OUT2, and a second electrode of the ninth transistor M9 is connected to the second output signal terminal OP2 and configured to output the second output signal OUT2. A first electrode of the third capacitor C3 is connected to the second node Q2, and a second electrode of the third capacitor C3 is connected to the second electrode of the ninth transistor M9 (i.e., the second output signal terminal OP2).

As shown in FIG. 9A, the common reset circuit 340 can be implemented to include a tenth transistor M10 and an eleventh transistor M11. A gate electrode of the tenth transistor M10 is connected to the fifth node QBA, a first electrode of the tenth transistor M10 is connected to the fourth node N, and a second electrode of the tenth transistor M10 is configured to receive the fourth voltage VGL1. A gate electrode of the eleventh transistor M11 is connected to the sixth node QB_B, a first electrode of the eleventh transistor M11 is connected to the fourth node N, and a second electrode of the eleventh transistor M11 is configured to receive the fourth voltage VGL1.

As shown in FIG. 9A, the first control circuit 130 can be implemented to include a twelfth transistor M12 and a thirteenth transistor M13. A gate electrode and a first electrode of the twelfth transistor M12 are configured to receive the second voltage VDD_A, and a second electrode of the twelfth transistor M12 is connected to the fifth node QB_A. A gate electrode of the thirteenth transistor M13 is connected to the first node Q1, a first electrode of the thirteenth transistor M13 is connected to the fifth node QB_A, and a second electrode of the thirteenth transistor M13 is configured to receive the fourth voltage VGL1.

As shown in FIG. 9A, the first reset circuit 140 can be implemented to include a fourteenth transistor M14, a fifteenth transistor M15, and a sixteenth transistor M16, and the second reset circuit 150 can be implemented to include a seventeenth transistor M17, an eighteenth transistor M18, and a nineteenth transistor M19.

A gate electrode of the fourteenth transistor M14 is connected to the fifth node QB_A, a first electrode of the fourteenth transistor M14 is connected to the first node Q1, and a second electrode of the fourteenth transistor M14 is configured to receive the fourth voltage VGL1. A gate electrode of the fifteenth transistor M15 is connected to the fifth node QB_A, a first electrode of the fifteenth transistor M15 is connected to the shift signal output terminal CRT, and a second electrode of the fifteenth transistor M15 is configured to receive the fourth voltage VGL1. A gate electrode of the sixteenth transistor M16 is connected to the fifth node QB_A, a first electrode of the sixteenth transistor M16 is connected to the first output signal terminal OP1, and a second electrode of the sixteenth transistor is configured to receive the fifth voltage VGL2.

A gate electrode of the seventeenth transistor M17 is connected to the sixth node QB_B, a first electrode of the seventeenth transistor M17 is connected to the first node Q1, and a second electrode of the seventeenth transistor M17 is configured to receive the fourth voltage VGL1. A gate electrode of the eighteenth transistor M18 is connected to the sixth node QB_B, a first electrode of the eighteenth transistor M18 is connected to the shift signal output terminal CRT, and a second electrode of the eighteenth transistor M18 is configured to receive the fourth voltage VGL1. A gate electrode of the nineteenth transistor M19 is connected to the sixth node QB_B, a first electrode of the nineteenth transistor M19 is connected to the first output signal terminal OP1, and a second electrode of the nineteenth transistor M19 is configured to receive the fifth voltage VGL2.

As shown in FIG. 9B, the second control circuit 230 can be implemented to include a twentieth transistor M20 and a twenty-first transistor M21. A gate electrode and a first electrode of the twentieth transistor M20 are configured to receive the third voltage VDD_B, and a second electrode of the twentieth transistor M20 is connected to the sixth node QB_B. A gate electrode of the twenty-first transistor M21 is connected to the second node Q2, a first electrode of the twenty-first transistor M21 is connected to the sixth node QB_B, and a second electrode of the twenty-first transistor M21 is configured to receive the fourth voltage VGL1.

As shown in FIG. 9B, the third reset circuit 240 can be implemented to include a twenty-second transistor M22 and a twenty-third transistor M23, and the fourth reset circuit 250 can be implemented to include a twenty-fourth transistor M24 and a twenty-fifth transistor M25.

A gate electrode of the twenty-second transistor M22 is connected to the sixth node QB_B, a first electrode of the twenty-second transistor M22 is connected to the second node Q2, and a second electrode of the twenty-second transistor M22 is configured to receive the fourth voltage VGL1. A gate electrode of the twenty-third transistor M23 is connected to the sixth node QB_B, a first electrode of the twenty-third transistor M23 is connected to the second output signal terminal OP2, and a second electrode of the twenty-third transistor M23 is configured to receive the fifth voltage VGL2.

A gate electrode of the twenty-fourth transistor M24 is connected to the fifth node QB_A, a first electrode of the twenty-fourth transistor M24 is connected to the second node Q2, and a second electrode of the twenty-fourth transistor M24 is configured to receive the fourth voltage VGL1. A gate electrode of the twenty-fifth transistor M25 is connected to the fifth node QB_A, a first electrode of the twenty-fifth transistor M25 is connected to the second output signal terminal OP2, and a second electrode of the twenty-fifth transistor M25 is configured to receive the fifth voltage VGL2.

It should be noted that in the embodiments of the present disclosure, for example, the second voltage VDD_A and the third voltage VDD_B can be configured to be mutually inverted signals, that is, if the second voltage VDD_A is at a high level, the third voltage VDD_B is at a low level, if the second voltage VDD_A is at a low level, and the third voltage VDD_B is at a high level. In this way, only one of the twelfth transistor M12 and the twentieth transistor M20 can be in the turn-on state at the same time, which can avoid performance drift caused by long-term turned-on of the transistor, thereby improving the stability of the circuit.

In the shift register unit 10 shown in FIGS. 9A and 9B, the first control circuit 130 is arranged in the first sub-unit 100 to control the level of the fifth node QB_A, and the second control circuit 230 is arranged in the second sub-unit 200 to control the level of the sixth node QB_B. This method can save the number of transistors, thereby further reducing the frame size of the display device using the shift register unit 10 and improving the PPI of the display device.

As shown in FIG. 9A, the third control circuit 160 can be implemented to include a thirty-second transistor M32 and a thirty-third transistor M33. A gate electrode of the thirty-second transistor M32 is configured to receive the first clock signal CLKA, a first electrode of the thirty-second transistor M32 is connected to the fifth node QBA, and a second electrode of the thirty-second transistor M32 is connected to a first electrode of the thirty-third transistor M33. A gate electrode of the thirty-third transistor M33 is connected to the third node H, and a second electrode of the thirty-third transistor M33 is configured to receive the fourth voltage VGL1.

The fourth control circuit 170 can be implemented as a thirty-fourth transistor M34. A gate electrode of the thirty-fourth transistor M34 is configured to receive the first input signal STU1, a first electrode of the thirty-fourth transistor M34 is connected to the fifth node QB_A, and a second electrode of the thirty-fourth transistor M34 is configured to receive the fourth voltage VGL1.

As shown in FIG. 9B, the fifth control circuit 260 can be implemented to include a thirty-fifth transistor M35 and a thirty-sixth transistor M36. A gate electrode of the thirty-fifth transistor M35 is configured to be connected to the second clock sub-signal line CLKA2 to receive the second clock sub-signal CLKA2, a first electrode of the thirty-fifth transistor M35 is connected to the sixth node QB_B, and a second electrode of the thirty-fifth transistor M35 is connected to a first electrode of the thirty-sixth transistor M36. A gate electrode of the thirty-sixth transistor M36 is connected to the third node H, and a second electrode of the thirty-sixth transistor M36 is configured to receive the fourth voltage VGL1.

The sixth control circuit 270 can be implemented as a thirty-seventh transistor M37. A gate electrode of the thirty-seventh transistor M37 is configured to receive the first input signal STU1, a first electrode of the thirty-seventh transistor M37 is connected to the sixth node QB_B, and a second electrode of the thirty-seventh transistor M37 is configured to receive the fourth voltage VGL1.

As shown in FIG. 9A, the fifth reset circuit 180 can be implemented as a thirty-eighth transistor M38, and the sixth reset circuit 190 can be implemented as a fortieth transistor M40. A gate electrode of the thirty-eighth transistor M38 is configured to receive the display reset signal STD, a first electrode of the thirty-eighth transistor M38 is connected to the first node Q1, and a second electrode of the thirty-eighth transistor M38 is configured to receive the fourth voltage VGL1. A gate electrode of the fortieth transistor M40 is configured to receive the global reset signal TRST, a first electrode of the fortieth transistor M40 is connected to the first node Q1, and a second electrode of the fortieth transistor M40 is configured to receive the fourth voltage VGL1.

As shown in FIG. 9B, the seventh reset circuit 280 can be implemented as a thirty-ninth transistor M39, and the eighth reset circuit 290 can be implemented as a forty-first transistor M41. A gate electrode of the thirty-ninth transistor M39 is configured to receive the display reset signal STD, a first electrode of the thirty-ninth transistor M39 is connected to the second node Q2, and a second electrode of the thirty-ninth transistor M39 is configured to receive the fourth voltage VGL1. A gate electrode of the forty-first transistor M41 is configured to receive the global reset signal TRST, a first electrode of the forty-first transistor M41 is connected to the second node Q2, and a second electrode of the forty-first transistor M41 is configured to receive the fourth voltage VGL1.

Figure 11A:
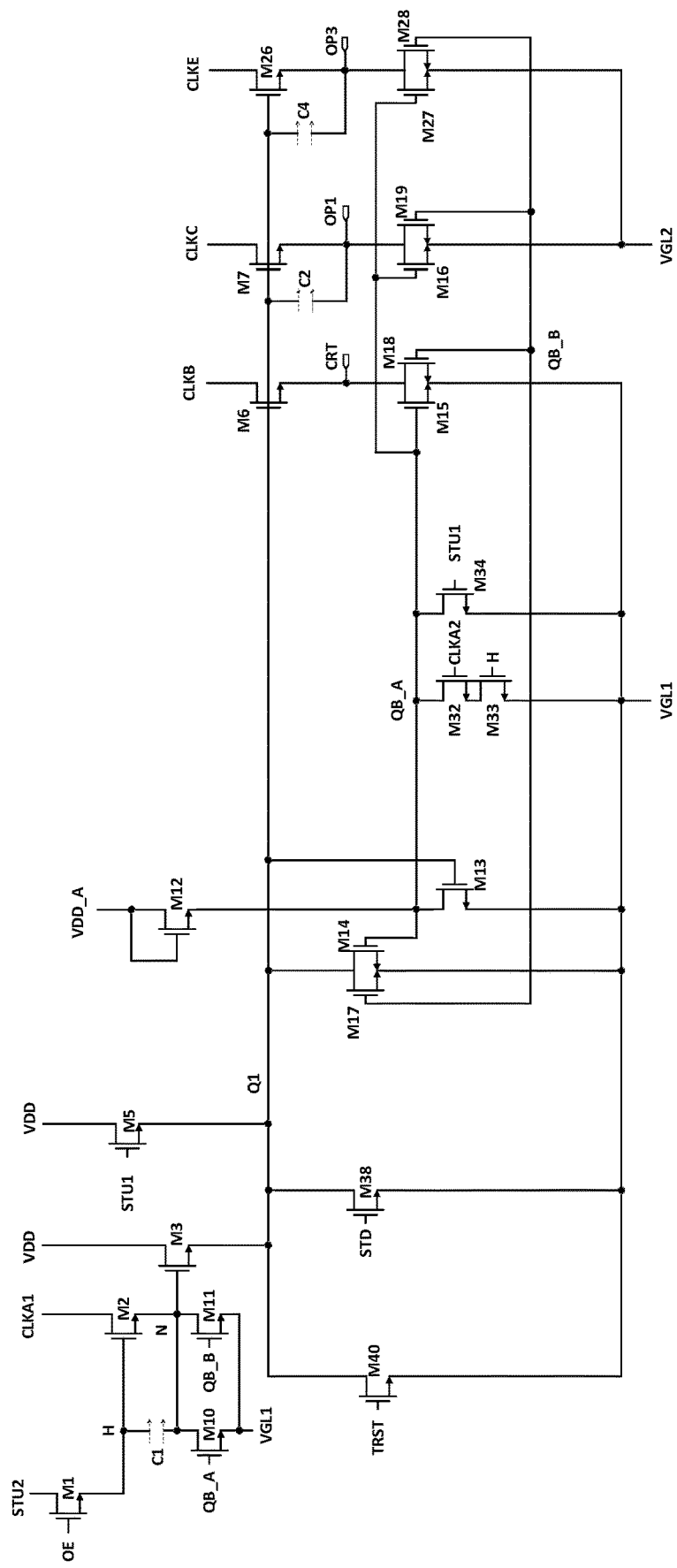
FIGS. 11A and 11B are circuit diagrams of still another shift register unit provided by an embodiment of the present disclosure.
Figure 11B:
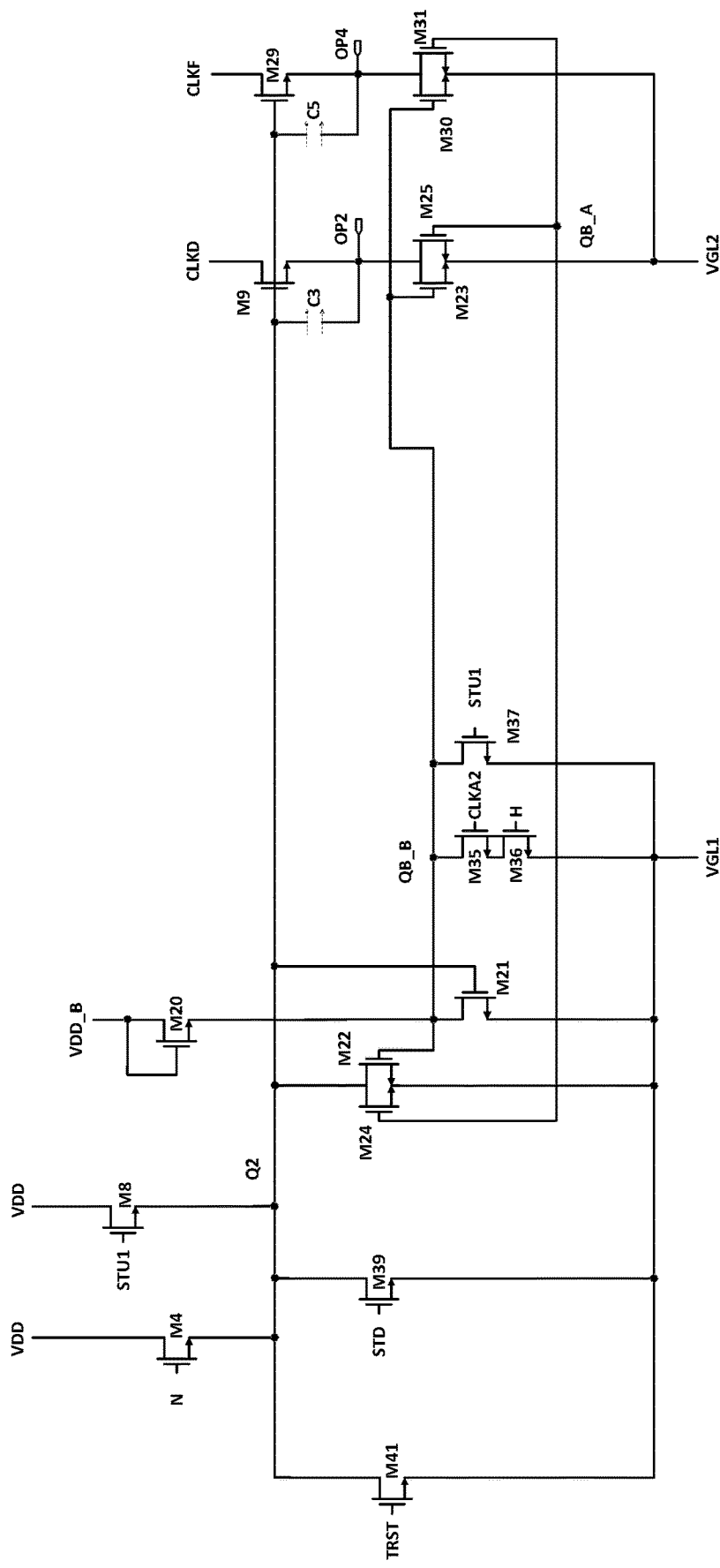

An embodiment of the present disclosure also provides a shift register unit 10, as shown in FIGS. 11A and 11B, the following only describes the differences between the shift register unit 10 shown in FIGS. 11A and 11B and the shift register unit 10 shown in FIGS. 9A and 9B, and the similarities will not be repeated.

As shown in FIGS. 11A and 11B, the first sub-unit 100 further includes a third output signal terminal OP3, and the third output signal terminal OP3 is configured to output a third output signal OUT3. The second sub-unit 200 further includes a fourth output signal terminal OP4, and the fourth output signal terminal OP4 is configured to output a fourth output signal OUT4. Accordingly, the first reset circuit 140 and the second reset circuit 150 are also configured to reset the third output signal terminal OP3. The third reset circuit 240 and the fourth reset circuit 250 are also configured to reset the fourth output signal terminal OP4.

As shown in FIG. 11A, the first output circuit 120 further includes a twenty-sixth transistor M26 and a fourth capacitor C4. A gate electrode of the twenty-sixth transistor M26 is connected to the first node Q1, a first electrode of the twenty-sixth transistor M26 is configured to receive a fifth clock signal CLKE, and a second electrode of the twenty-sixth transistor M26 is connected to the third output signal terminal OP3. A first electrode of the fourth capacitor C4 is connected to the first node Q1, and a second electrode of the fourth capacitor C4 is connected to the third output signal terminal OP3.

For example, in one example, the fifth clock signal CLKE can be configured to be the same as the third clock signal CLKC; for another example, in another example, the fifth clock signal CLKE can be configured to be different from the third clock signal CLKC, which allows the first output signal terminal OP1 and the third output signal terminal OP3 to output different signals, respectively, thereby improving the driving ability of the shift register unit 10 and increasing the diversity of the output signal.

The first reset circuit 140 further includes a twenty-seventh transistor M27. A gate electrode of the twenty-seventh transistor M27 is connected to the fifth node QB_A, a first electrode of the twenty-seventh transistor M27 is connected to the third output signal terminal OP3, and a second electrode of the twenty-seventh transistor M27 is configured to receive the fifth voltage VGL2.

The second reset circuit 150 further includes a twenty-eighth transistor M28. A gate electrode of the twenty-eighth transistor M28 is connected to the sixth node QB_B, a first electrode of the twenty-eighth transistor M28 is connected to the third output signal terminal OP3, and a second electrode of the twenty-eighth transistor M28 is configured to receive the fifth voltage VGL2.

As shown in FIG. 11B, the second output circuit 220 further includes a twenty-ninth transistor M29 and a fifth capacitor C5. A gate electrode of the twenty-ninth transistor M29 is connected to the second node Q2, a first electrode of the twenty-ninth transistor M29 is configured to receive the sixth clock signal CLKF, and a second electrode of the twenty-ninth transistor M29 is connected to the fourth output signal terminal OP4. A first electrode of the fifth capacitor C5 is connected to the second node Q2, and a second electrode of the fifth capacitor C5 is connected to the fourth output signal terminal OP4.

For example, in one example, the sixth clock signal CLKF can be configured to be the same as the fourth clock signal CLKD; for another example, in another example, the sixth clock signal CLKF can be configured to be different from the fourth clock signal CLKD, so that the second output signal terminal OP2 and the fourth output signal terminal OP4 can output different signals, respectively, to improve the driving ability of the shift register unit 10 and increase the diversity of the output signal.

The third reset circuit 240 further includes a thirtieth transistor M30. A gate electrode of the thirtieth transistor M30 is connected to the sixth node QB_B, a first electrode of the thirtieth transistor M30 is connected to the fourth output signal terminal OP4, and a second electrode of the thirtieth transistor M30 is configured to receive the fifth voltage VGL2.

The fourth reset circuit 250 further includes a thirty-first transistor M31. A gate electrode of the thirty-first transistor M31 is connected to the fifth node QB_A, a first electrode of the thirty-first transistor M31 is connected to the fourth output signal terminal OP4, and a second electrode of the thirty-first transistor M31 is configured to receive the fifth voltage VGL2.

As mentioned above, in the shift register unit 10 provided in the embodiment of the present disclosure, the first capacitor C1 can be used to maintain the potential at the third node H, the second capacitor C2 and the fourth capacitor C4 can be used to maintain the potential at the first node Q1, and the third capacitor C3 and the fifth capacitor C5 can be used to maintain the potential at the second node Q2. The first capacitor C1, the second capacitor C2, the third capacitor C3, the fourth capacitor C4, and the fifth capacitor C5 can be capacitor devices made through a process, such as achieving the capacitor devices by forming specialized capacitor electrodes, and each electrode of the capacitor can be achieved through a metal layer, a semiconductor layer (such as doped polysilicon), and the like, alternatively, in some examples, by designing circuit wiring parameters, the first capacitor C1, the second capacitor C2, the third capacitor C3, the fourth capacitor C4, and the fifth capacitor C5 can also be implemented through parasitic capacitors between various devices. The connection methods of the first capacitor C1, the second capacitor C2, the third capacitor C3, the fourth capacitor C4, and the fifth capacitor C5 are not limited to the method described above, but can also be other suitable connection methods, as long as the levels written to the third node H, the first node Q1, and the second node Q2 can be stored.

When the potentials of the first node Q1, the second node Q2, or the third node H are maintained at a high level, the first electrodes of some transistors (such as the first transistor M1, the fourteenth transistor M14, the seventeenth transistor M17, the thirty-eighth transistor M38, the fortieth transistor M40, the twenty-second transistor M22, the twenty-fourth transistor M24, the thirty-ninth transistor M39, and the forty-first transistor M41) are connected to the first node Q1, the second node Q2, or the third node H, and the second electrodes of the some transistors are connected to a low-level signal. Even when the gate input of these transistors is a non-conductive signal, leakage may also occur due to a voltage difference between the first electrode and the second electrode, thus, the effect of maintaining the potentials of the first node Q1, the second node Q2, or the third node H in the shift register unit 10 becomes worse.

For example, as shown in FIG. 11A, taking the third node H as an example, the first electrode of the first transistor M1 is configured to receive the second input signal STU2, and the second electrode of the first transistor M1 is connected to the third node H. When the third node His at a high level and the second input signal STU2 is at a low level, the third node H may leak electricity through the first transistor M1.

Figure 12A:
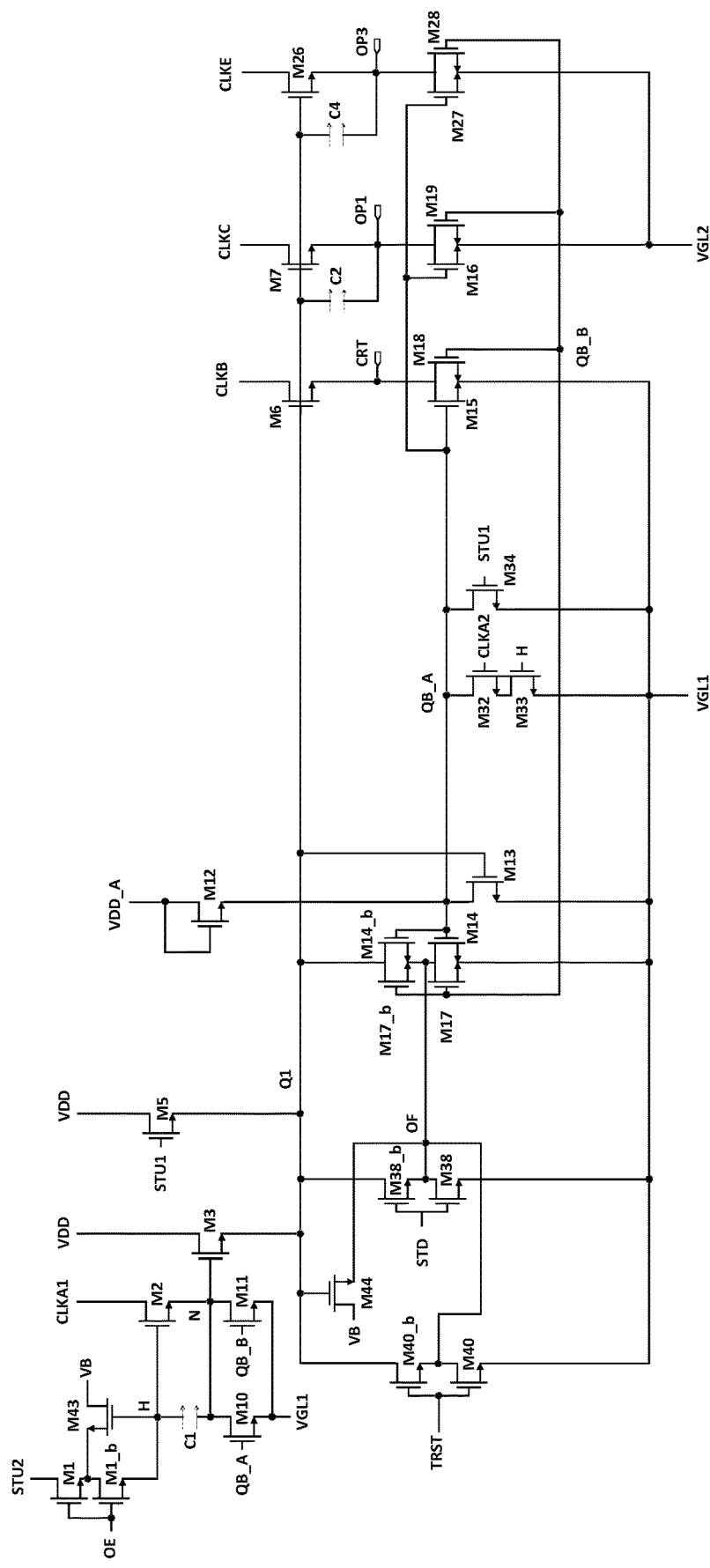
FIGS. 12A to 12C are circuit diagrams of yet another shift register unit provided by an embodiment of the present disclosure.
Figure 12B:
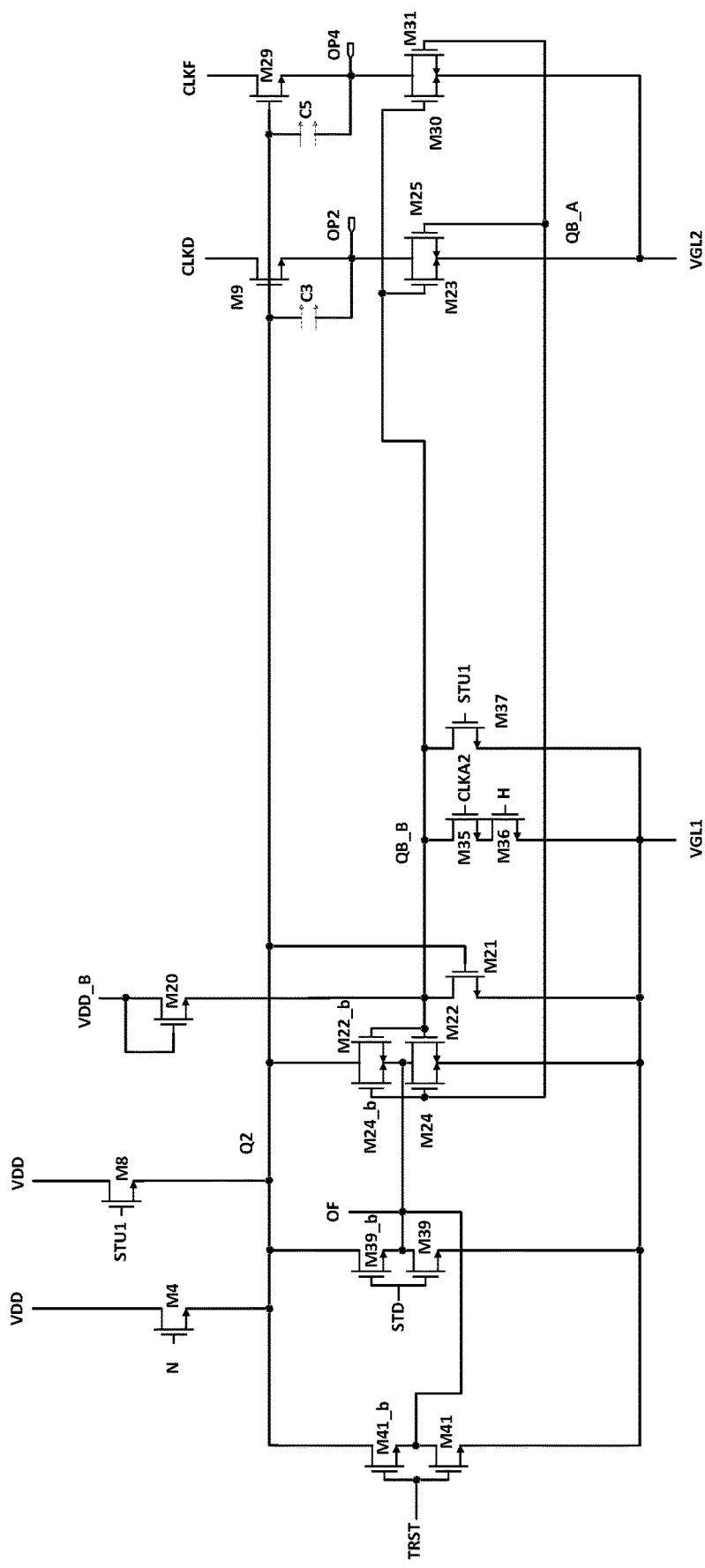

As for the above problems, as shown in FIGS. 12A and 12B, an embodiment of the present disclosure provides a shift register unit 10 with a leakage prevention structure. The shift register unit 10 further includes a common leakage prevention circuit, a first leakage prevention circuit, and a second leakage prevention circuit.

The common leakage prevention circuit is electrically connected to the first node Q1 and the seventh node OF, and is configured to control the level of the seventh node OF under the control of the level of the first node Q1. The first leakage prevention circuit is electrically connected to the seventh node OF, the first reset circuit 140, the second reset circuit 150, the fifth reset circuit 180, and the sixth reset circuit 190, and is configured to prevent leakage of the first node Q1 under the control of the level of the seventh node OF. The second leakage prevention circuit is electrically connected to the seventh node OF, the third reset circuit 240, the fourth reset circuit 250, the seventh reset circuit 280, and the eighth reset circuit 290, and is configured to prevent leakage of the second node Q2 under the control of the level of the seventh node OF.

For example, as shown in FIGS. 12A and 12B, the common leakage prevention circuit can be implemented as a forty-fourth transistor M44, a gate electrode of the forty-fourth transistor M44 is connected to the first node Q1, a first electrode of the forty-fourth transistor M44 is configured to receive the sixth voltage VB, and a second electrode of the forty-fourth transistor M44 is connected to the seventh node OF. The first leakage prevention circuit can be implemented to include a first leakage prevention transistor M14_b, a second leakage prevention transistor M17_b, a third leakage prevention transistor M38_b, and a fourth leakage prevention transistor M40_b. The second leakage prevention circuit can be implemented to include a fifth leakage prevention transistor M22_b, a sixth leakage prevention transistor M24_b, a seventh leakage prevention transistor M39_b, and an eighth leakage prevention transistor M41_b. The connection relationships of the first leakage prevention transistor M14_b, the second leakage prevention transistor M17_b, the third leakage prevention transistor M38_b, the fourth leakage prevention transistor M40_b, the fifth leakage prevention transistor M22_b, the sixth leakage prevention transistor M24_b, the seventh leakage prevention transistor M39b, and the eighth leakage prevention transistor M41_b are shown in FIGS. 12A and 12B, and will not be described here again.

At the same time, as shown in FIG. 12A, in order to prevent leakage at the third node H, a forty-third transistor M43 and a ninth leakage prevention transistor M1_b are also added. The working principle of leakage prevention is explained below by taking the ninth leakage prevention transistor M1_b as an example.

A gate electrode of the ninth leakage prevention transistor M1_b is connected to the gate electrode of the first transistor M1, a first electrode of the ninth leakage prevention transistor M1_b is connected to the second electrode of the forty-third transistor M43, and a second electrode of the ninth leakage prevention transistor M1_b is connected to the third node H. A gate electrode of the forty-third transistor M43 is connected to the third node H, and a first electrode of the forty-third transistor M43 is configured to receive the sixth voltage VB (for example, a high level). When the third node His at a high level, the forty-third transistor M43 is turned on under the control of the level of the third node H, so that the sixth voltage VB of the high level can be input to the first electrode of the ninth leakage prevention transistor M1_b, and therefore, both the first electrode and the second electrode of the ninth leakage prevention transistor M1_b are at a high level, thereby preventing the electric charges at the third node H from leaking through the ninth leakage prevention transistor M1_b. In this case, because the gate electrode of the ninth leakage prevention transistor M1_b is connected to the gate electrode of the first transistor M1, the combination of the first transistor M1 and the ninth leakage prevention transistor M1_b can achieve the same functions as the first transistor M1 above-mentioned, while also having a leakage prevention effect.

Similarly, as shown in FIG. 12A, the first leakage prevention transistor M14_b, the second leakage prevention transistor M17_b, the third leakage prevention transistor M38_b, and the fourth leakage prevention transistor M40_b can be connected through the seventh node OF and the forty-fourth transistor M44, to respectively achieve leakage prevention structures, thereby preventing leakage at the first node Q1. As shown in FIG. 12B, the fifth leakage prevention transistor M22_b, the sixth leakage prevention transistor M24_b, the seventh leakage prevention transistor M39_b, and the eighth leakage prevention transistor M41_b can be connected through the seventh node OF and the forty-fourth transistor M44, to respectively achieve leakage prevention structures, thereby preventing leakage at the second node Q2.

In the shift register unit 10 shown in FIGS. 12A and 12B, the first leakage prevention circuit and the second leakage prevention circuit can share the transistor M44, thereby saving the number of transistors, thereby reducing the frame size of the display device using the shift register unit 10, and improving the PPI of the display device.

Figure 12C:
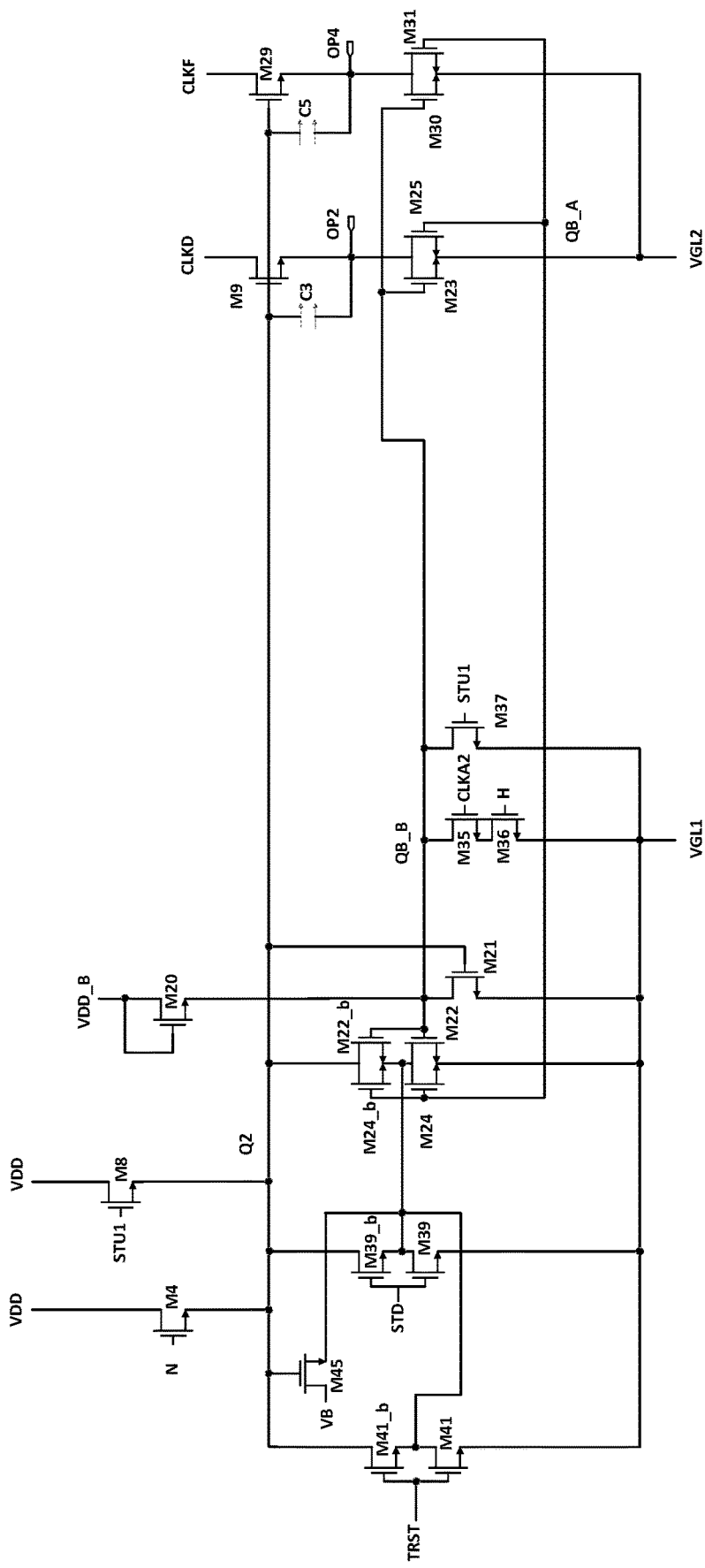

For example, in another example, as shown in FIG. 12C, the second leakage prevention circuit (the fifth leakage prevention transistor M22_b, the sixth leakage prevention transistor M24_b, the seventh leakage prevention transistor M39_b, and the eighth leakage prevention transistor M41_b) can also be not connected to the seventh node OF, but separately provides with a forty-fifth transistor M45 to form a leakage prevention structure, which will not be described further herein.

Figure 6A:
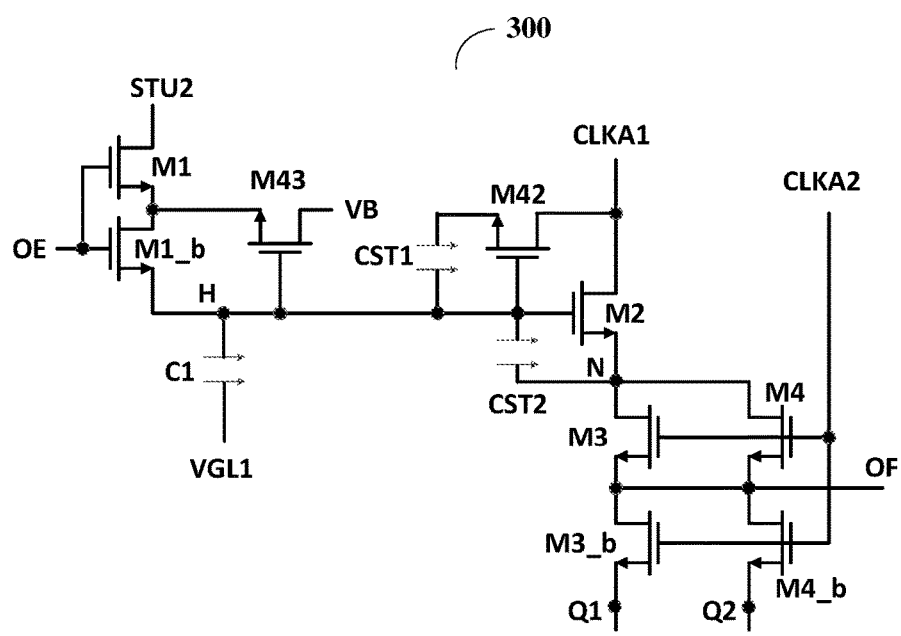
FIGS. 6A-6B are circuit diagrams of two blanking input sub-units having a leakage prevention structure provided by an embodiment of the present disclosure.

Similarly, as shown in FIG. 6A, for the third transistor M3 and the fourth transistor M4, a tenth leakage prevention transistor M3_b and an eleventh leakage prevention transistor M4_b can be respectively set to achieve a leakage prevention structure. Gate electrodes of the tenth leakage prevention transistor M3_b and the eleventh leakage prevention transistor M4_b are both connected to the second clock sub-signal CLKA2 and are configured to receive the second clock sub-signal CLKA2, a first electrode of the tenth leakage prevention transistor M3_b and a first electrode of the eleventh leakage prevention transistor M4_b are connected to the seventh node OF, thereby achieving to connect with the forty-fourth transistor M44 in FIG. 12A, to respectively achieve a leakage prevention structure, thereby preventing leakage at the first node Q1 and the second node Q2.

Figure 6B:
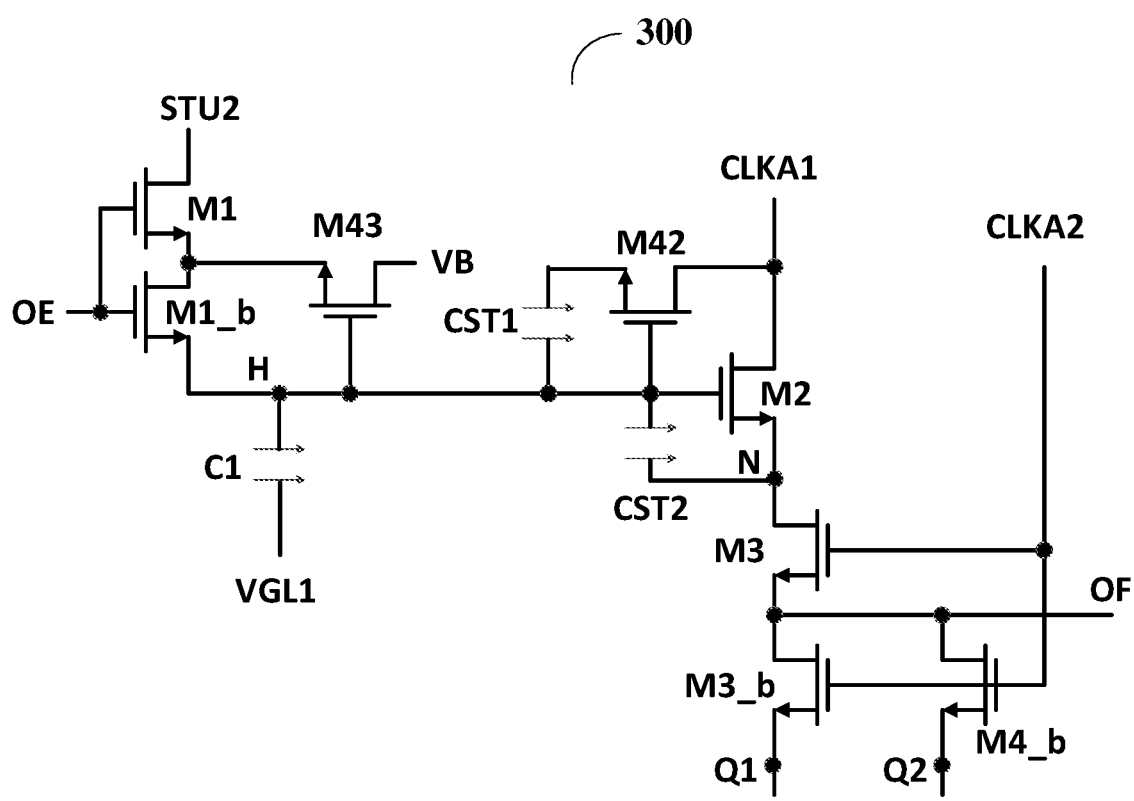

As shown in FIG. 6B, for the third transistor M3, the tenth leakage prevention transistor M3_b and the eleventh leakage prevention transistor M4_b can be respectively set to achieve a leakage prevention structure, thereby preventing leakage at the first node Q1 and the second node Q2. The embodiments of the present disclosure do not limit this.

Similarly, as shown in FIG. 10C, for the fifth transistor M5, a transistor M5_b can be set to achieve a leakage prevention structure. A gate electrode of the transistor M5_b is configured to receive the first input signal STU1, and a first electrode of the transistor M5_b is connected to the seventh node OF, thereby achieving to connect with the forty-fourth transistor M44 in FIG. 12A, to achieve a leakage prevention structure, thereby preventing leakage at the first node Q1.

Figure 13:
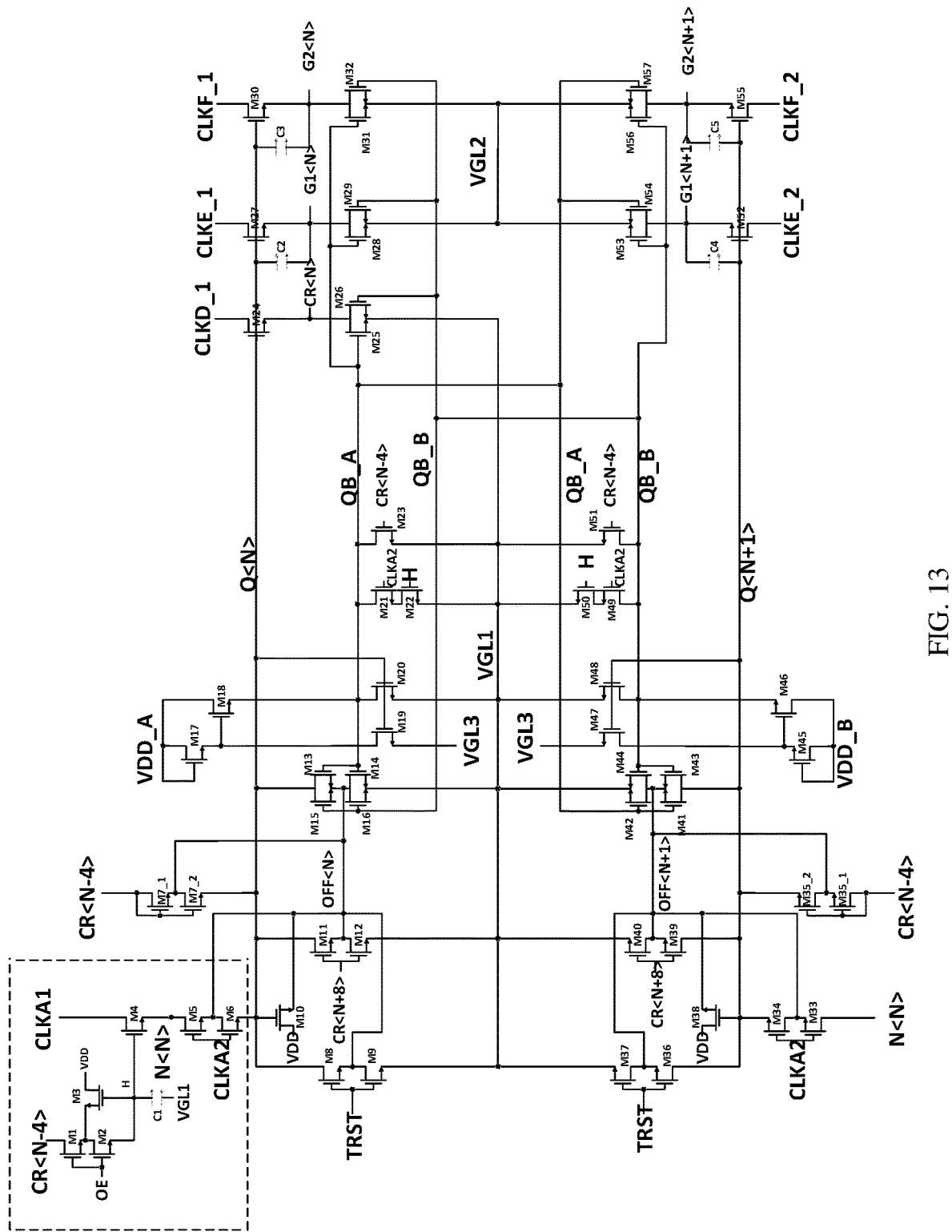
FIG. 13 is a circuit diagram of another shift register unit provided by an embodiment of the present disclosure.

It should be noted that the present disclosure does not limit the specific structure of the shift register unit, as long as the signal lines providing the first clock sub-signal and the second clock sub-signal are set to different clock signal lines (the first clock sub-signal line CLKA1 and the second clock sub-signal line CLKA2) to solve the existing technical problems, for example, the shift register unit shown in FIG. 13 can also be used, and the specific connection relationship can be referred to FIG. 9A-12C, which will not be described again here.

In the embodiments of the present disclosure, the first clock sub-signal line CLKA1 connected to the first electrode of the second transistor M2 and the second clock sub-signal line CLKA2 connected to the gate electrodes of the transistors M32, M35, M3, M4, M3_b, and M4_b are separately set instead of being set to the same signal line, thus ensuring that the voltage on the second clock sub-signal line CLKA2 connected to the gate electrode of each transistor does not decrease due to the decrease of the voltage on the first clock sub-signal line CLKA1 caused by the leakage of the clock signal on the first clock sub-signal line CLKA1 connected to the drain electrode of the transistor, thus avoiding the problem that the gate driving circuit cannot output the random compensation signal caused by the insufficient voltage of the gate electrode of the transistor due to the leakage of the same signal connected to the gate electrode of the transistor because of the leakage of the signal of the drain electrode of the transistor when the signal is supplied to the drain electrode and the gate electrode of the transistor through the same signal line (that is, when the first clock sub-signal line and the second clock sub-signal are the same signal line), and ensuring effective compensation for the display panel.

The transistors used in the embodiments of the present disclosure can be thin film transistors, field effect transistors, or other switching devices with the same characteristics. The embodiments of the present disclosure take thin film transistors as examples for explanation. The source electrode and the drain electrode of the transistor used here can be symmetrical in structure, and therefore, the source electrode and the drain electrode can be structurally indistinguishable. In the embodiments of the present disclosure, in order to distinguish the two electrodes of a transistor other than the gate electrode, it is directly described that one of the two electrodes is the first electrode and the other of the two electrodes is the second electrode. In addition, transistors can be divided into N-type transistors and P-type transistors according to their characteristics. When the transistor is a P-type transistor, the turn-on voltage is a low level voltage (e.g., 0V, −5V, −10V, or other suitable voltage), and the turn-off voltage is a high level voltage (e.g., 5V, 10V, or other suitable voltage); when the transistor is an N-type transistor, the turn-on voltage is a high level voltage (e.g., 5V, 10V, or other suitable voltage), and the turn-off voltage is a low level voltage (e.g., 0V, −5V, −10V, or other suitable voltage).

Figure 14:
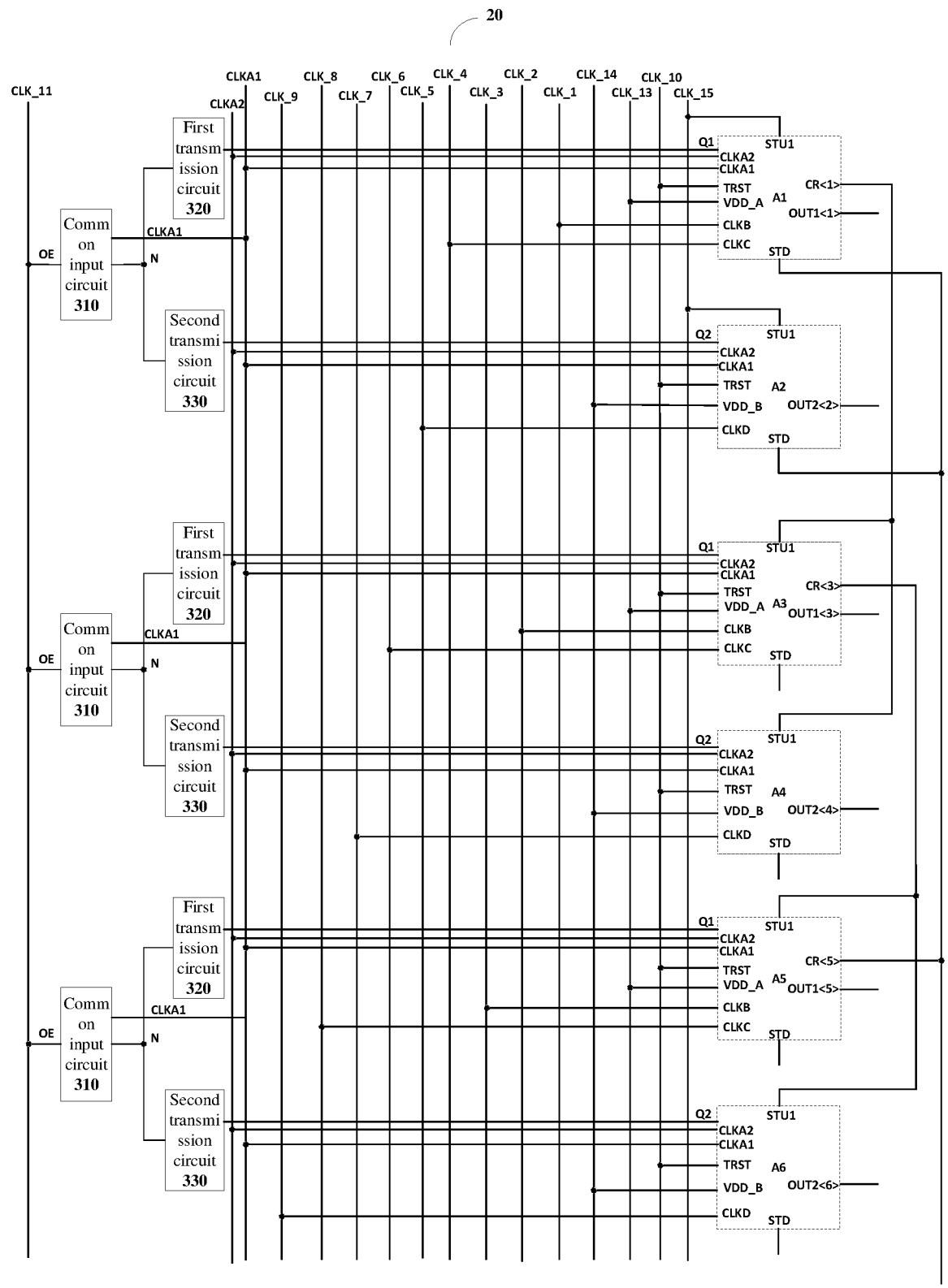
FIG. 14 is a schematic diagram of a gate driving circuit provided by an embodiment of the present disclosure.

An embodiment of the present disclosure also provides a gate driving circuit 20, as shown in FIG. 14, the gate driving circuit 20 includes a plurality of cascaded shift register units 10, any one or more shift register units 10 can adopt the structure or a variant thereof of the shift register unit 10 provided by the embodiment of the present disclosure. A1, A2, A3, A4, A5, and A6 in FIG. 14 represent sub-units in the shift register unit 10. For example, A1, A3, and A5 represent the first sub-units in three shift register units 10, respectively, and A2, A4, and A6 represent the second sub-units in the three shift register units 10, respectively.

For example, as shown in FIG. 14, each shift register unit 10 includes a first sub-unit and a second sub-unit to output a first output signal OUT1 and a second output signal OUT2, respectively. When the gate driving circuit 20 is used to drive a display panel, each of the first output signal OUT1 and the second output signal OUT2 can drive one row of sub-pixel units in the display panel. For example, A1, A2, A3, A4, A5, and A6 can drive a first row, a second row, a third row, a fourth row, a fifth row, and a sixth row of sub-pixel units of the display panel, respectively.

The gate driving circuit 20 provided by the embodiments of the present disclosure can share the blanking input sub-unit, thereby reducing the frame size of the display device using the gate driving circuit and improving the PPI of the display device. At the same time, random compensation can also be implemented, thereby avoiding the poor display problems such as the scan line and uneven display brightness caused by progressive sequential compensation.

Taking the gate driving circuit 20 shown in FIG. 14 as an example, the signal lines in the gate driving circuit 20 will be described below.

As shown in FIG. 14, the gate drive circuit 20 includes a first sub clock signal line CLK_1, a second sub clock signal line CLK_2, and a third sub clock signal line CLK_3. The first sub-unit in the (3n-2)-th stage shift register unit is connected to the first sub clock signal line CLK_1 to receive the second clock signal CLKB of the (3n-2)-th stage shift register unit; the first sub-unit in the (3n-1)-th stage shift register unit is connected to the second sub clock signal line CLK_2 to receive the second clock signal CLKB of the (3n-1)-th stage shift register unit; and the first sub-unit in the 3n-th stage shift register unit is connected to the third sub clock signal line CLK_3 to receive the second clock signal CLKB of the 3n-th stage shift register unit; n is an integer greater than zero.

As described above, when the shift register units 10 are cascaded, it is only necessary to sequentially provide the second clock signal CLKB to the first sub-unit in each stage of the shift register units 10, and the second clock signal CLKB can be output as the shift signal CR to complete the scan shift.

As shown in FIG. 14, the gate driving circuit 20 also includes a fourth sub clock signal line CLK_4, a fifth sub clock signal line CLK_5, a sixth sub clock signal line CLK_6, a seventh sub clock signal line CLK_7, an eighth sub clock signal line CLK_8, and a ninth sub clock signal line CLK_9.

The first sub-unit in the (3n-2)-th stage shift register unit is connected to the fourth sub clock signal line CLK_4 to receive the third clock signal CLKC of the (3n-2)-th stage shift register unit; and the second sub-unit in the (3n-2)-th stage shift register unit is connected to the fifth sub clock signal line CLK_5 to receive the fourth clock signal CLKD of the (3n-2)-th stage shift register unit.

The first sub-unit in the (3n-1)-th stage shift register unit is connected to the sixth sub clock signal line CLK_6 to receive the third clock signal CLKC of the (3n-1)-th stage shift register unit; and the second sub-unit in the (3n-1)-th stage shift register unit is connected to the seventh sub clock signal line CLK_7 to receive the fourth clock signal CLKD of the (3n-1)-th stage shift register unit.

The first sub-unit in the 3n-th stage shift register unit is connected to the eighth sub clock signal line CLK_8 to receive the third clock signal CLKC of the 3n-th stage shift register unit; and the second sub-unit in the 3n-th stage shift register unit is connected to the ninth sub clock signal line CLK_9 to receive the fourth clock signal CLKD of the 3n-th stage shift register unit.

As described above, a total of six clock signal lines, namely, the fourth sub clock signal line CLK_4, the fifth sub clock signal line CLK_5, the sixth sub clock signal line CLK_6, the seventh sub clock signal line CLK_7, the eighth sub clock signal line CLK_8, and the ninth sub clock signal line CLK_9, are used to provide driving signals, which are output row-by-row, to the respective shift register units 10. That is, the gate driving circuit 20 provided by the embodiments of the present disclosure can adopt clock signals of 6CLK, which can make the waveforms of the driving signals output by the gate driving circuit 20 overlap. For example, the pre charging time of each row of sub-pixel units can be increased, so that the gate driving circuit can be suitable for high frequency scanning display. The embodiments of the present disclosure do not limit the types of clock signals used, for example, clock signals such as 8CLK and 10CLK can also be used.

As shown in FIG. 14, the gate driving circuit 20 further includes a tenth sub clock signal line CLK_10, an eleventh sub clock signal line CLK_11, a first clock sub-signal line CLKA1, and a second clock sub-signal line CLKA2.

For example, the first sub-unit and the second sub-unit in each stage shift register unit 10 are connected to the tenth sub clock signal line CLK_10 to receive the global reset signal TRST. The common input circuit 310 in each stage shift register unit 10 is connected to the eleventh sub clock signal line CLK_11 to receive the selection control signal OE. The first sub-unit, the second sub-unit, and the common input circuit 310 in each stage shift register unit 10 are all connected to the first clock sub-signal line CLKA1 to receive the first clock sub-signal CLKA1.

As shown in FIG. 14, the gate driving circuit 20 further includes a thirteenth sub clock signal line CLK_13 and a fourteenth sub clock signal line CLK_14.

For example, the first sub-unit in each stage shift register unit 10 is connected to the thirteenth sub clock signal line CLK_13 to receive the second voltage VDD_A; the second sub-unit in each stage shift register unit 10 is connected to the fourteenth sub clock signal line CLK_14 to receive the third voltage VDD_B.

As shown in FIG. 14, the gate driving circuit 20 further includes a fifteenth sub clock signal line CLK_15, the first sub-unit and the second sub-unit in the first stage shift register unit 10 are connected to the fifteenth sub clock signal line CLK_15 to receive the first input signal STU1.

As shown in FIG. 14, in addition to the first stage shift register unit 10, the first sub-unit and the second sub-unit in the other stage shift register unit 10 are connected to the first sub-unit in the previous stage shift register unit 10 to receive the shift signal CR to serve as the first input signal STU1. In addition to the last two stage shift register units 10, the first sub-unit and the second sub-unit in the other stage shift register unit 10 are respectively connected to the first sub-units in the next two stage shift register units 10 to receive the shift signal CR to serve as the display reset signal STD.

It should be noted that the cascading relationship shown in FIG. 14 is only an example. According to the description of the present disclosure, other cascading modes can also be used according to actual situations.

Figure 15:
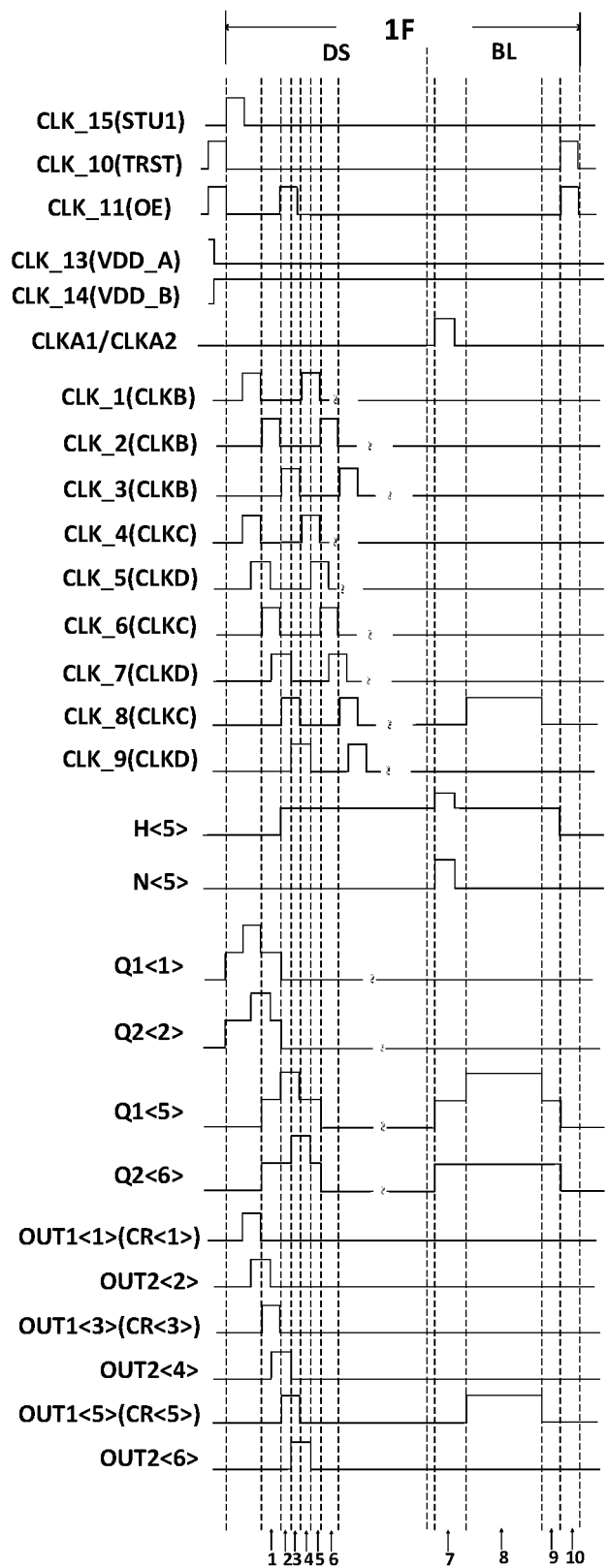
FIG. 15 is a signal timing diagram corresponding to the operation of the gate driving circuit shown in FIG. 14 provided by an embodiment of the present disclosure.

For example, in one example, the shift register unit 10 in the gate driving circuit 20 shown in FIG. 14 can adopt the circuit structure shown in FIGS. 9A and 9B, and FIG. 15 shows a signal timing diagram when the gate driving circuit 20 shown in FIG. 14 operates.

In FIG. 15, H<5> represents the third node H in the third stage shift register unit 10, the third stage shift register unit 10 corresponds to the fifth row and the sixth row of sub-pixel units in the display panel. N<5> indicates the fourth node N in the third stage shift register unit 10.

Q1<1> and Q2<2> represent the first node Q1 and the second node Q2 in the first stage shift register unit 10, respectively; Q1<5> and Q2<6> represent the first node Q1 and the second node Q2 in the third stage shift register unit 10, respectively. The numbers in parentheses indicate the number of the row of sub-pixel units in the display panel corresponding to the node. The following embodiments are the same and will not be repeated.

OUT1<1> and OUT2<2> represent the first output signal OUT1 and the second output signal OUT2 output by the first stage shift register unit 10, respectively. Similarly, OUT1<3> and OUT2<4> represent the first output signal OUT1 and the second output signal OUT2 output by the second stage shift register unit 10, respectively; OUT1<5> and OUT2<6> represent the first output signal OUT1 and the second output signal OUT2 output by the third stage shift register unit 10, respectively. CR<1>, CR<3>, and CR<5> are the shift signals CR output by the first stage shift register unit 10, the second stage shift register unit 10, and the third stage shift register unit 10, respectively. For example, as shown in FIG. 15, in the embodiment, CR<1> and OUT1<1> are the same, CR<3> and OUT1<3> are the same, and CR<5> and OUT1<5> are the same.

1F represents the first frame, DS represents the display period in the first frame, and BL represents the blanking period in the first frame. In addition, it should be noted that in FIG. 15, by tasking the second voltage VDD_A being shown as a low level and the third voltage VDD_B being shown as a high level as an example, but the embodiments of the present disclosure are not limited thereto. The signal levels in the signal timing diagram shown in FIG. 15 are only schematic and do not represent true level values.

The working principle of the gate driving circuit 20 shown in FIG. 14 will be explained below in conjunction with the signal timing diagram in FIG. 15 and the shift register unit 10 shown in FIGS. 9A and 9B.

Before the start of the first frame 1F, the tenth sub clock signal line CLK_10 and the eleventh sub clock signal line CLK_11 provide a high level, the fortieth transistor M40 and the forty-first transistor M41 in each stage shift register unit 10 are turned on, so that the first node Q1 and the second node Q2 in each stage shift register unit 10 can be reset; the first transistor M1 in each stage shift register unit 10 is turned on, because the second input signal STU2 received at this time is at a low level, the third node H in each stage shift register unit 10 can be reset, thereby achieving a global reset before the start of the first frame 1F.

In the display period DS of the first frame 1F, the working process for the third stage shift register unit 10 (i.e., corresponding to the fifth row and the sixth row of the sub-pixel units in the display panel) is described as follows.

In a first phase 1, the shift signal CR<3> output by the first sub-unit in the second stage shift register unit 10 is at a high level, that is, the first input signal STU1 received by the third stage shift register unit 10 is at a high level, so that the fifth transistor M5 and the eighth transistor M8 are turned on. The high level first voltage VDD charges the first node Q1<5> through the fifth transistor M5 and charges the second node Q2<6> through the eighth transistor M8, thereby pulling both the first node Q1<5> and the second node Q2<6> up to the high level.

The seventh transistor M7 is turned on under the control of the first node Q1<5>, but because the third clock signal CLKC provided by the eighth sub clock signal line CLK_8 is at a low level at this time, the first output signal OUT1<5> output by the third stage shift register unit 10 is at a low level; the ninth transistor M9 is turned on under the control of the second node Q2<6>, but because the fourth clock signal CLKD provided by the ninth sub clock signal line CLK_9 is at a low level at this time, the second output signal OUT2<6> output by the third stage shift register unit 10 is at a low level; in this phase, the first node and the second node in the third stage shift register unit 10 are simultaneously pre charged.

In a second phase 2, the third clock signal CLKC provided by the eighth sub clock signal line CLK_8 becomes high, and the potential of the first node Q1<5> is further pulled up due to the bootstrap effect, and therefore, the seventh transistor M7 remains to be turned on, so that the first output signal OUT1<5> output by the third stage shift register unit 10 becomes high. However, because the fourth clock signal CLKD provided by the ninth sub clock signal line CLK_9 is still at a low level, the second output signal OUT2<6> output by the third stage shift register unit 10 continues to remain at a low level.

In a third phase 3, the fourth clock signal CLKD provided by the ninth sub clock signal line CLK_9 becomes high, the potential of the second node Q2<6> is further pulled up due to the bootstrap effect, and the ninth transistor M9 remains to be turned on, so that the second output signal OUT2<6> output by the third stage shift register unit 10 becomes high.

In a fourth phase 4, due to the holding effect of the second capacitor C2, the first node Q1<5> remains at a high level, so the seventh transistor M7 is turned on. However, because the third clock signal CLKC provided by the eighth sub clock signal line CLK_8 becomes low, the first output signal OUT1<5> output by the third stage shift register unit 10 becomes low. At the same time, due to the bootstrap effect of the second capacitor C2, the potential of the first node Q1<5> will also decrease.

In a fifth phase 5, due to the holding effect of the third capacitor C3, the second node Q2<6> remains at a high level, so the ninth transistor M9 is turned on. However, because the fourth clock signal CLKD provided by the ninth sub clock signal line CLK_9 becomes high, the second output signal OUT2<6> output by the third stage shift register unit 10 becomes low. At the same time, due to the bootstrap effect of the third capacitor C3, the potential of the second node Q2<6> will also decrease.

In a sixth phase 6, because the embodiment adopts clock signals of 6CLK, the signals output by every three stage shift register units 10 (each stage shift register unit sequentially outputs the first output signal OUT1 and the second output signal OUT2) is a cycle, at the same time, because the third stage shift register unit 10 receives the shift signal CR output by the fifth stage shift register unit 10 as the display reset signal STD, in this phase, when the third clock signal CLKC provided by the sixth sub clock signal line CLK_6 becomes a high level, the display reset signal STD received by the third stage shift register unit 10 also becomes a high level, so that the thirty-eighth transistor M38 and the thirty-ninth transistor M39 are turned on, and thus, a pull-down reset can be completed for the first node Q1<5> and the second node Q2<6> using the low level fourth voltage VGL1.

After the third stage shift register unit 10 drives the sub pixels in the fifth row and the sixth row of the display panel to complete the display, and so on, the fourth stage shift register unit 10 and the fifth stage shift register unit 10 drives the sub-pixel units in the display panel row by row to complete display driving for one frame. So far, the display period of the first frame ends.

At the same time, the third node H is also charged during the display period DS of the first frame 1F. For example, when it is necessary to compensate the fifth row of sub-pixel units in the first frame 1F, the following operations are also performed during the display period DS of the first frame 1F.

In the second phase 2 and the third phase 3, the eleventh sub clock signal line CLK_11 provides the same signal as the shift signal CR<5> output by the third stage shift register unit 10, so that the first transistor M1 is turned on. At the same time, the second input signal STU2 received by the third stage shift register unit 10 is the same as the shift signal CR<5>, so that the high level second input signal STU2 can charge the third node H<5> and pull the third node H<5> up to the high level.

It should be noted that the above charging process for the third node H<5> is only an example, and the embodiments of the present disclosure include, but are not limited to, this. For example, the second input signal STU2 received by the third stage shift register unit 10 can also be the same as the shift signal CR output by the other stage shift register unit 10, while making the signal provided to the eleventh sub clock signal line CLK_11 have the same signal timing as the second input signal STU2.

The high potential of the third node H<5> can be maintained until the blanking period BL of the first frame 1F. When it is necessary to compensate the fifth row of sub-pixel units in the first frame 1F, the following operations are also performed in the blanking period BL of the first frame 1F.

In the seventh phase 7, the first clock sub-signal CLKA1 and the second clock sub-signal CLKA2 provided by the first clock sub-signal line CLKA1 and the second clock sub-signal line CLKA2 are at a high level. Because the third node H<5> remains at a high level during this phase, the second transistor M2 is turned on, the high level first clock sub-signal CLKA1 is transmitted to the fourth node N<5> through the second transistor M2, thereby causing the fourth node N<5> to become a high level. The third transistor M3 and the fourth transistor M4 are turned on under the control of the fourth node N<5>, so the high-level first voltage VDD can charge the first node Q1<5> and the second node Q2<6>, respectively. The potentials of the first node Q1<5> and the second node Q2<6> are pulled up.

Alternatively, in the example shown in FIGS. 5B-5D, the third transistor M3 and the fourth transistor M4 are turned on under the control of the second clock sub-signal CLKA2, so that the high level of the fourth node N<5> can respectively charge the first node Q1<5> and the second node Q2<6>, and the potentials of the first node Q1<5> and the second node Q2<6> are pulled up.

At the same time, in the seventh phase 7, due to the coupling effect of the first capacitor C1, the fourth node N<5> changes from a low level to a high level, which will couple and pull up the third node H<5>, thus allowing the third node H<5> to remain at a high potential, ensuring that the second transistor M2 is fully turned on.

Then the first clock sub-signal CLKA1 and the second clock sub-signal CLKA2 provided by the first clock sub-signal line CLKA1 and the second clock sub-signal line CLKA2 change from a high level to a low level, so that the fourth node N<5> becomes low, and due to the coupling effect of the first capacitor C1, the potential of the third node H<5> also decreases. In an eighth phase 8, the third clock signal CLKC provided by the eighth sub clock signal line CLK_8 becomes high, and the potential of the first node Q1<5> is further pulled up due to the bootstrap effect. Therefore, the seventh transistor M7 remains to be turned on, so that the first output signal OUT1<5> output by the third stage shift register unit 10 becomes high. However, because the fourth clock signal CLKD provided by the ninth sub clock signal line CLK_9 is still at a low level, the second output signal OUT2<6> output by the third stage shift register unit 10 is at a low level.

For example, the first output signal OUT1<5> output in the eighth phase 8 can be used to drive the sensing transistor in the sub-pixel unit in the display panel to achieve external compensation.

In a ninth phase 9, due to the holding effect of the second capacitor C2, the first node Q1<5> remains at a high level, so that the seventh transistor M7 is turned on. However, because the third clock signal CLKC provided by the eighth sub clock signal line CLK_8 becomes low, the first output signal OUT1<5> output by the third stage shift register unit 10 becomes low. At the same time, due to the bootstrap effect of the second capacitor C2, the potential of the first node Q1<5> will also decrease.

In a tenth phase 10, the tenth sub clock signal line CLK_10 and the eleventh sub clock signal line CLK_11 provide a high level, and the fortieth transistor M40 and the forty-first transistor M41 in each stage shift register unit 10 are turned on, so that the first node Q1 and the second node Q2 in each stage shift register unit 10 can be reset; the first transistor M1 in each stage shift register unit 10 is turned on, because the second input signal STU2 received at this time is at a low level, the third node H in each stage shift register unit 10 can be reset to complete a global reset.

So far, the driving timing of the first frame ends. The drive of the gate driving circuit in subsequent phases such as the second frame and the third frame can refer to the above description, which will not be repeated here.

It should be noted that when describing the working principle of random compensation above, taking a case that the driving signal corresponding to the fifth row of sub-pixel units of the display panel is output during the blanking period of the first frame as an example, and the present disclosure is not limited to this. For example, when it is necessary to output a driving signal corresponding to an n-th row of sub-pixel units of the display panel during the blanking period of a certain frame, it is necessary to pull the corresponding third node H up to the high level during the display period DS of the frame, at the same time, in the blanking period BL of the frame, a high-level first clock signal CLKA is provided to pull up the potential of the first node Q1 or the second node Q2, and then when it is necessary to output a high-level driving signal, a high-level third clock signal CLKC or fourth clock signal CLKD is provided, and n is an integer greater than zero.

In addition, in the embodiments of the present disclosure, the same timing of two signals refers to time synchronization at a high level, without requiring the same amplitude of the two signals.

Figure 17:
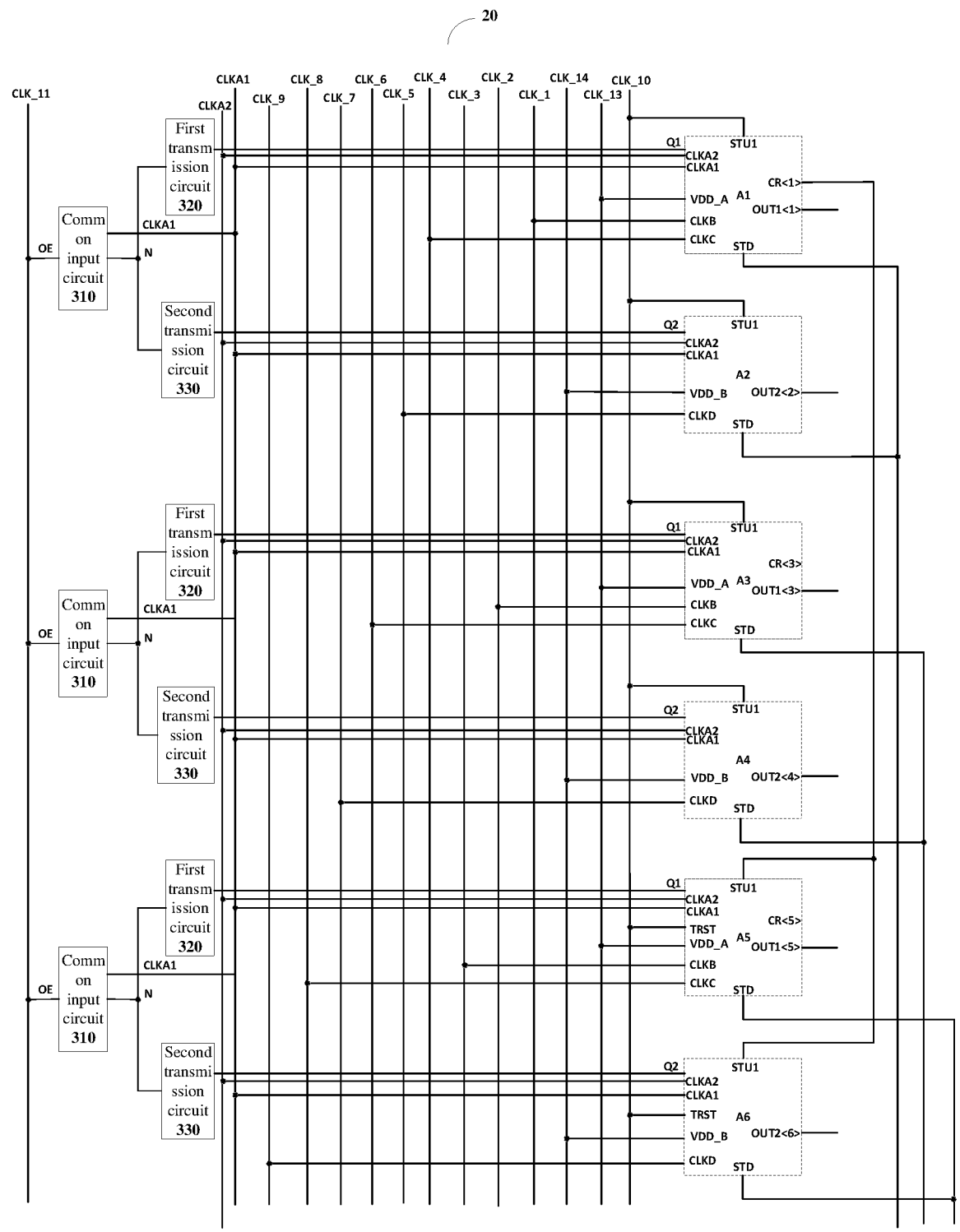
FIG. 17 is a schematic diagram of another gate driving circuit provided by an embodiment of the present disclosure.
Figure 18:
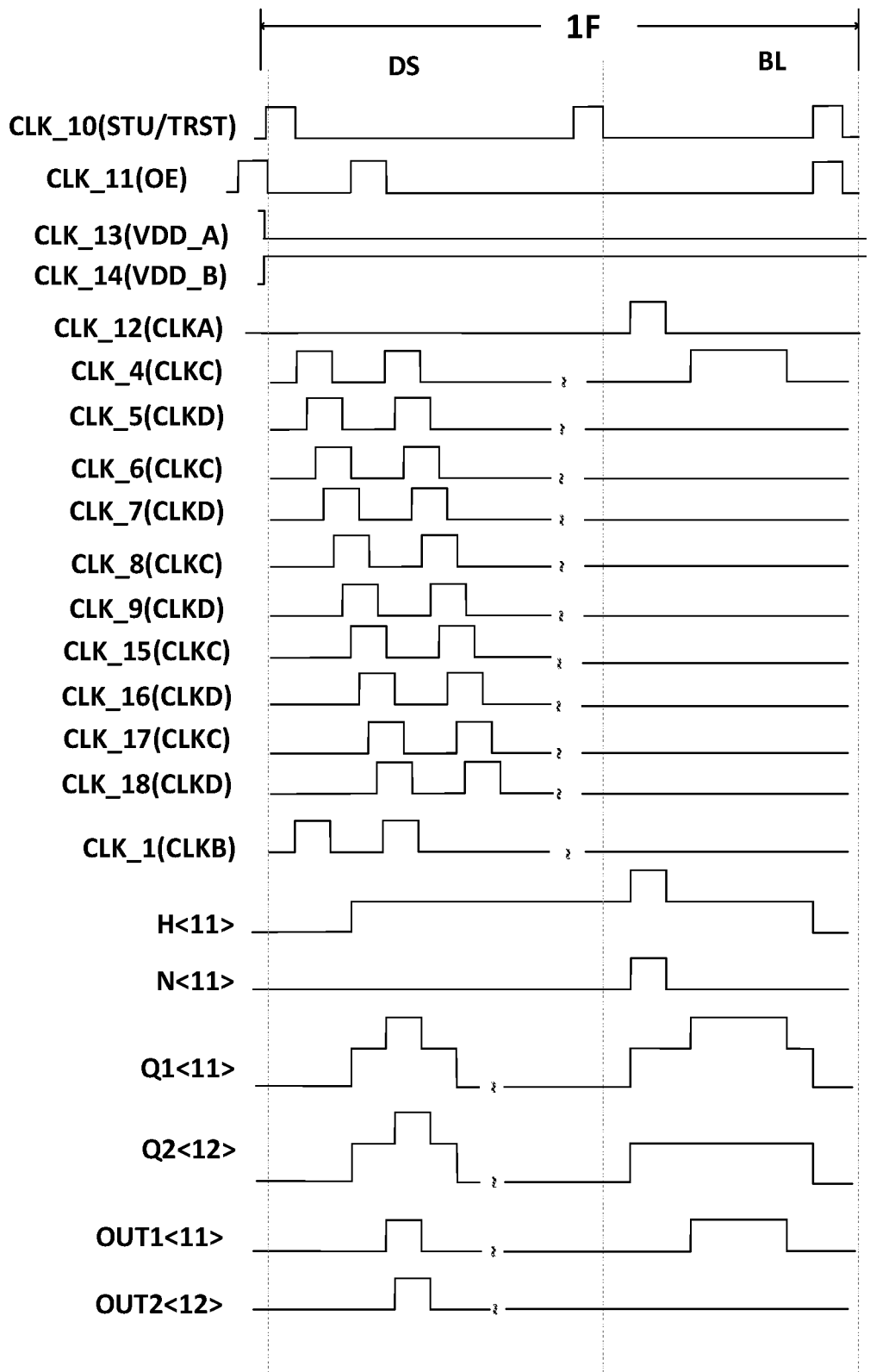
FIG. 18 is a signal timing diagram corresponding to the operation of the gate driving circuit shown in FIG. 17 provided by an embodiment of the present disclosure.

An embodiment of the present disclosure also provides a gate driving circuit 20, as shown in FIG. 17, and FIG. 18 is a signal timing diagram corresponding to the operation of the gate driving circuit shown in FIG. 17. The difference between the gate driving circuit 20 shown in FIG. 17 and the gate driving circuit 20 shown in FIG. 14 is described below.

As shown in FIGS. 17 and 18, in the embodiment, the gate driving circuit 20 uses clock signals of 10CLK, a total of ten clock signal lines, namely, a fourth sub clock signal line CLK_4, a fifth sub clock signal line CLK_5, a sixth sub clock signal line CLK_6, a seventh sub clock signal line CLK_7, an eighth sub clock signal line CLK_8, a ninth sub clock signal line CLK_9, a fifteenth sub clock signal line CLK_15, and a sixteenth sub clock signal line CLK_16, the seventeenth sub clock signal line CLK_17, and the eighteenth sub clock signal line CLK_18, are used to provide driving signals, which are output row-by-row, to the respective shift register units 10. In the embodiment, by adopting clock signals of 10CLK, the pre charging time of each row of sub-pixel units can be increased, so that the gate driving circuit can be suitable for high frequency scanning display.

In the embodiments shown in FIGS. 17 and 18, in addition to the first two stage shift register units 10, the other stage shift register unit 10 is connected to the first sub-units of the first two stage shift register units 10 to receive the shift signal CR to serve as the first input signal STU1. In addition to the last four stage shift register units 10, the other stage shift register unit 10 is connected to the first sub-units of the next four stage shift register units 10 to receive the shift signal CR to serve as the display reset signal STD.

As shown in FIG. 17, in the embodiment, the tenth sub clock signal line CLK_10 is connected to the first sub-units and the second sub-units (i.e., A1, A2, A3, and A4) of the first two stage shift register units 10 to provide the first input signal STU1, and at the same time, the tenth sub clock signal line CLK_10 is also connected to the other stage shift register unit 10 to provide the global reset signal TRST. In this way, the number of clock signal lines can be saved, thereby reducing the frame size of the display device using the gate driving circuit, and improving the PPI of the display device. For example, for the first two stage shift register units 10, the fortieth transistor M40 and the forty-first transistor M41 may not be set.

Figure 19:
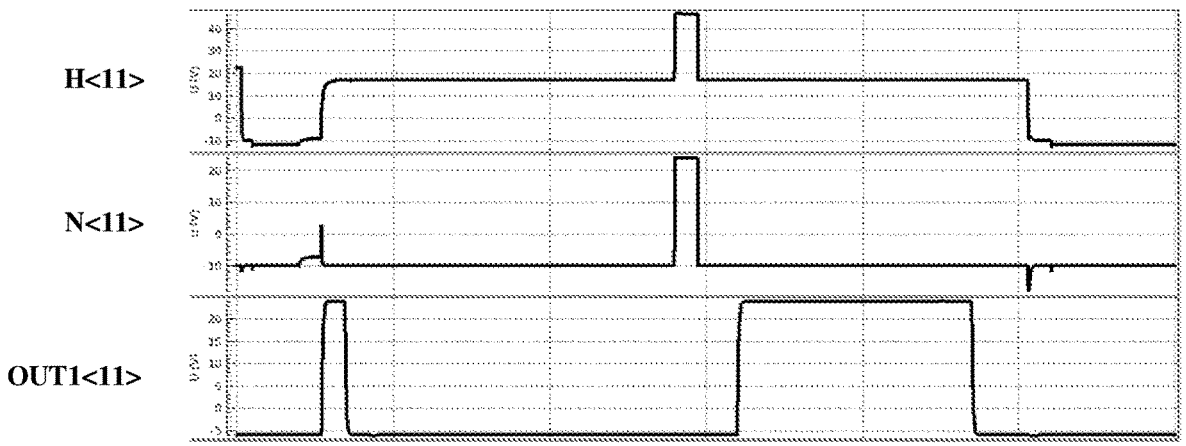
FIG. 19 is a signal simulation diagram of the gate driving circuit shown in FIG. 17.

As shown in FIG. 18, in the embodiment, selecting to perform compensation on the eleventh row of sub-pixel units (corresponding to the sixth stage shift register unit 10). During the display period DS of the first frame 1F, the third node H<11> is charged; during the blanking period BL, a high-level first clock signal CLKA is provided to complete to charge the first node Q1<11> and the second node Q2<12>, and then, the fourth sub clock signal line CLK_4 provides a high level third clock signal such that the first output signal OUT1<11> output by the sixth stage shift register unit 10 is at a high level, and the first output signal OUT1<11> can be used to drive the eleventh row of sub-pixel units to complete external compensation. FIG. 19 shows a signal simulation diagram of the gate driving circuit shown in FIG. 17.

For example, due to the large number of clock signals in the gate driving circuit and the fact that the clock signals are high-frequency signals, and therefore, a large number of crosses between clock signals can lead to a high defect rate, at the same time, multiple crosses can cause a large capacitor of the clock signal, resulting in a large falling edge in the output of the gate driving circuit, which is difficult to meet the high PPI and high refresh frequency requirements.

The embodiments of the present disclosure also provide a gate driving circuit, a plurality of shift register units connected to the same signal line in a plurality of cascaded shift register units of the gate driving circuit are continuously arranged.

Figure 16A:
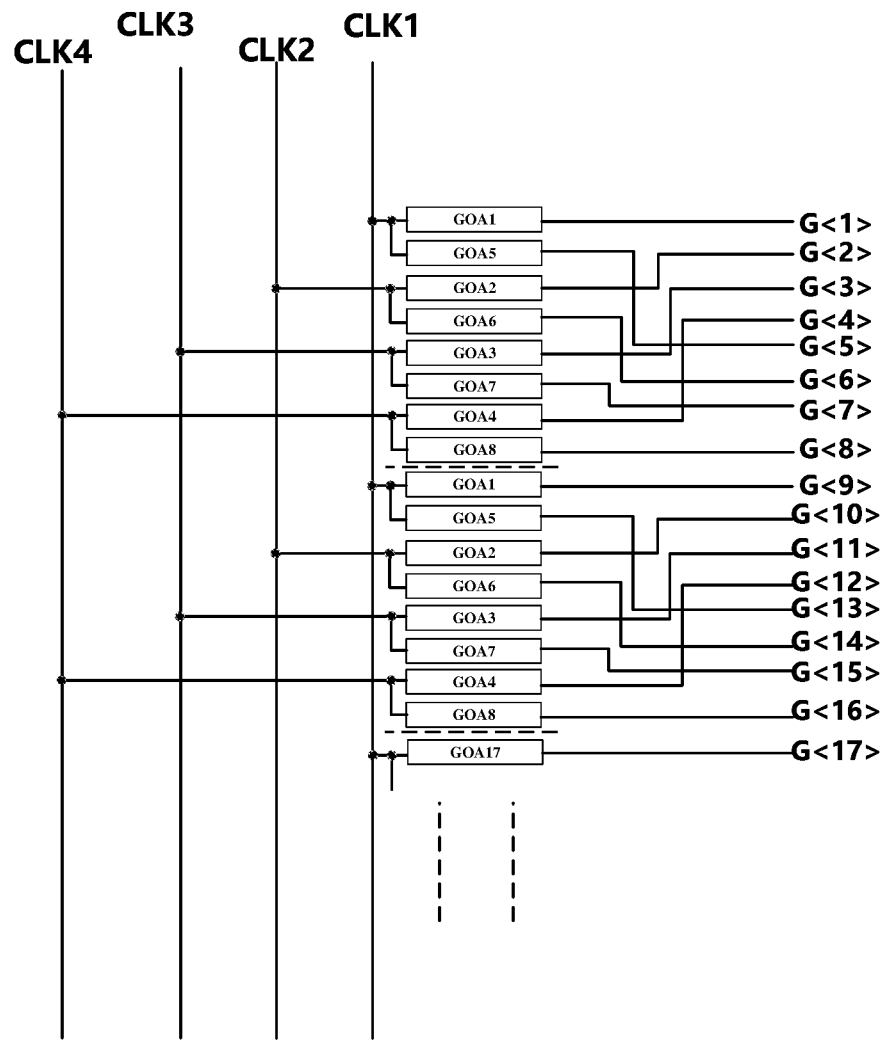
FIGS. 16A-16B are a diagram of a layout of another gate driving circuit provided by an embodiment of the present disclosure.

For example, as shown in FIG. 16A, placing shift register units connected to the same clock signal line together reduces the cross between clock signals, reduces the capacitor between clock signals, and thus reduces the falling edge in the output of the shift register unit. At the same time, reducing the cross can also improve the yield of the gate driving circuit.

For example, as shown in FIG. 16A, the shift register units GOA1 and GOA5 connected to the clock signal line CLK1 are continuously arranged, the shift register units GOA2 and GOA6 connected to the clock signal line CLK2 are continuously arranged, the shift register units GOA3 and GOA7 connected to the clock signal line CLK3 are continuously arranged, and the shift register units GOA4 and GOA8 connected to the clock signal line CLK4 are continuously arranged. In this arrangement, the clock signal line CLK2 and the clock signal line CLK1 will only overlap once, and the capacitors of both the clock signal line CLK1 and the clock signal line CLK2 will be reduced by half compared to the existing scheme. The signals on the clock signal lines CLK1-CLK4 are high-frequency signal, frequent jumps are very sensitive to the capacitor. Although this arrangement increases the overlap of the outputs G<1>-G<8>, these signals are low-frequency outputs, and the increased capacitor does not accumulate, and the influence is not significant (because the capacitor of the gate line is 200 picofarad (pF), and the overlap portion is at most 10 farads (fF)). This arrangement greatly reduces the cross between signal lines CLK, and also increases the yield.

Figure 16B:
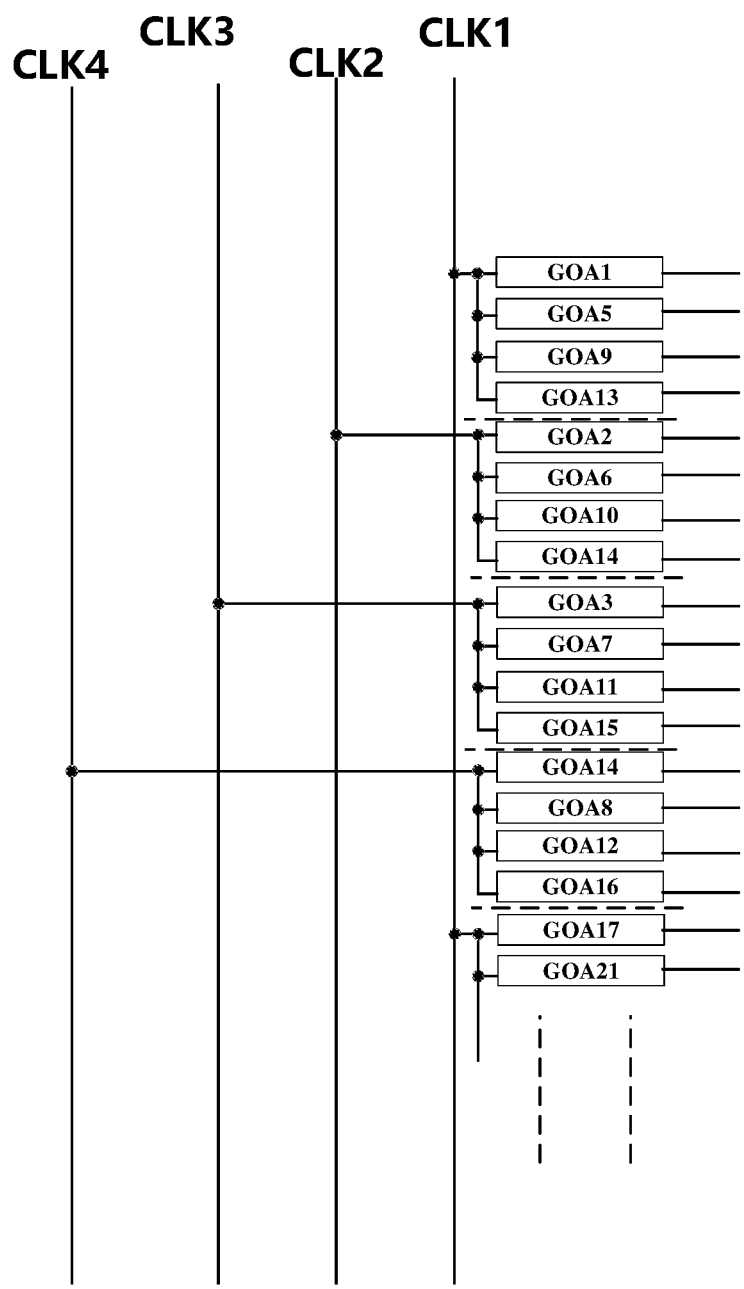

FIG. 16B shows that four shift register units connected to the same signal line are arranged row by row. This arrangement can reduce the capacitor of the signal line CLK to a quarter of the original. By analogy, eight shift register units connected to the same signal line CLK can be arranged row by row, and sixteenth shift register units connected to the same signal line CLK can be arranged row by row. The embodiments of the present disclosure do not limit this.

It should be noted that FIGS. 16A and 16B only exemplify the arrangement of shift register units connected to the same signal line, for clarity and simplicity, a gate driving circuit corresponding to the circuit structure provided in the embodiment of the present disclosure is not shown. However, according to the introduction of FIG. 14, it can be concluded that the gate driving circuit described above can be arranged using the arrangement shown in FIGS. 16A and 14C, which will not be described again here.

In addition, the timing and the working mode of the gate driving circuit in FIGS. 16A and 14C can be described with reference to FIGS. 14 and 15, and will not be discussed here.

Figure 20:
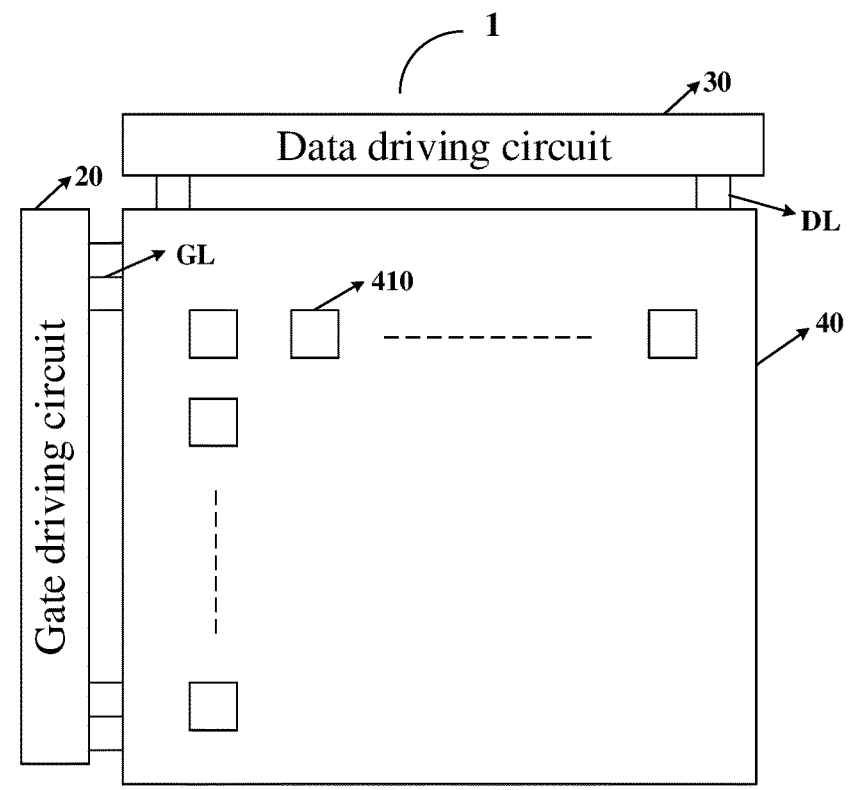
FIG. 20 is a schematic diagram of a display device provided by an embodiment of the present disclosure.

The embodiment of the present disclosure also provides a display device 1, as shown in FIG. 20, the display device 1 includes the gate driving circuit 20 provided by the embodiment of the present disclosure and a plurality of sub-pixel units 410 arranged in an array. For example, the display device 1 also includes a display panel 40, and a pixel array composed of the plurality of sub-pixel units 410 is arranged in the display panel.

The first output signal OUT1 and the second output signal OUT2 output by each shift register unit 10 in the driving drive circuit 20 are provided to the sub-pixel units 410 in different rows, respectively. For example, the gate driving circuit 20 is electrically connected to the sub-pixel unit 410 through a gate line GL. The gate driving circuit 20 is used to provide the driving signal to the pixel array, for example, the driving signal can drive the scanning transistor and the sensing transistor in the sub-pixel unit 410.

For example, the display device 1 may also include a data driving circuit 30, and the data driving circuit 30 is used for providing data signals to the pixel array. For example, the data driving circuit 30 is electrically connected to the sub-pixel unit 410 through a data line DL.

It should be noted that the display device 1 in the embodiment can be any product or component with a display function such as a liquid crystal panel, a liquid crystal TV, a display, an OLED panel, an OLED TV, an electronic paper display device, a mobile phone, a tablet computer, a notebook computer, a digital photo frame, navigator, etc.

The technical effect of the display device 1 provided by the embodiment of the present disclosure can refer to the corresponding description of the gate driving circuit 20 in the above embodiment, and will not be described here again.

The above is only the specific embodiment of the present disclosure, but the protection scope of the present disclosure is not limited to this case, and the protection scope of the present disclosure should be subject to the protection scope of the claims.

What is claimed is:

1. A display substrate, comprising: a base substrate, and a gate driving circuit and a plurality of signal lines arranged on the base substrate; wherein
    the plurality of signal lines comprise a first clock sub-signal line and a second clock sub-signal line which are independent of each other, wherein the first clock sub-signal line and the second clock sub-signal line are not connected to each other;
    the gate driving circuit comprises a plurality of shift register units that are cascaded, each shift register unit of the plurality of shift register units that are cascaded comprises a first sub-unit and a blanking input sub-unit;
    the first sub-unit comprises a first input circuit, a first output circuit, a first control circuit, and a third control circuit,
    the blanking input sub-unit comprises a first transmission circuit, a selection control circuit, and a third input circuit;
    the first input circuit is configured to control a level of a first node in response to a first input signal;
    the first output circuit is configured to output a shift signal and a first output signal under control of the level of the first node;
    the first transmission circuit is electrically connected with the first node and a fourth node, and is configured to control the level of the first node under control of a level of the fourth node or a first transmission signal;
    the selection control circuit is configured to control a level of a third node using a second input signal in response to a selection control signal, and to maintain the level of the third node;
    the third input circuit is connected with the third node, the fourth node, and the first clock sub-signal line, and is configured to transmit a first clock sub-signal provided by the first clock sub-signal line to the fourth node under control of the level of the third node to control the level of the fourth node and the first clock sub-signal line only provides the first clock sub-signal to the third input circuit;
    the first control circuit is configured to control a level of a fifth node under control of the level of the first node and a second voltage;
    the third control circuit is connected with the second clock sub-signal line and the fifth node, and is configured to control the level of the fifth node in response to a second clock sub-signal provided by the second clock sub-signal line and the second clock sub-signal line only provides the second clock sub-signal to the third control circuit;
    wherein an orthographic projection of the first clock sub-signal line on the base substrate and an orthographic projection of the second clock sub-signal line on the base substrate are arranged side by side, and the first clock sub-signal provided by the first clock sub-signal line is the same as the second clock sub-signal provided by the second clock sub-signal line.

2. The display substrate according to claim 1, wherein the shift register unit further comprises a second sub-unit, the second sub-unit comprises a second input circuit, a second output circuit, a second control circuit, a fifth control circuit, and a sixth control circuit,
    the second input circuit is configured to control a level of a second node in response to the first input signal;
    the second output circuit is configured to output a second output signal under control of the level of the second node;
    the second control circuit is configured to control a level of a sixth node under control of the level of the second node and a third voltage;
    the fifth control circuit is connected with the second clock sub-signal line and the sixth node, and is configured to control the level of the sixth node in response to the second clock sub-signal provided by the second clock sub-signal line; and
    the sixth control circuit is configured to control the level of the sixth node in response to the first input signal.

3. The display substrate according to claim 2, wherein the first sub-unit further comprises a fourth control circuit, a first reset circuit, a second reset circuit, a shift signal output terminal, and a first output signal terminal,
    wherein the shift signal output terminal is configured to output the shift signal, and the first output signal terminal is configured to output the first output signal;
    the first reset circuit is configured to reset the first node, the shift signal output terminal, and the first output signal terminal under control of the level of the fifth node;
    the second reset circuit is configured to reset the first node, the shift signal output terminal, and the first output signal terminal under control of the level of the sixth node; and the fourth control circuit is configured to control the level of the fifth node in response to the first input signal.

4. The display substrate according to claim 3, wherein the second sub-unit further comprises a third reset circuit, a fourth reset circuit, and a second output signal terminal;
the second output signal terminal is configured to output the second output signal;
the third reset circuit is configured to reset the second node and the second output signal terminal under control of the level of the sixth node; and
the fourth reset circuit is configured to reset the second node and the second output signal terminal under control of the level of the fifth node.

5. The display substrate according to claim 4, wherein the second control circuit comprises a twentieth transistor and a twenty-first transistor, the third reset circuit comprises a twenty-second transistor and a twenty-third transistor, and the fourth reset circuit comprises a twenty-fourth transistor and a twenty-fifth transistor;
a gate electrode and a first electrode of the twentieth transistor are configured to receive the third voltage, and a second electrode of the twentieth transistor is connected with the sixth node;
a gate electrode of the twenty-first transistor is connected with the second node, a first electrode of the twenty-first transistor is connected with the sixth node, and a second electrode of the twenty-first transistor is configured to receive a fourth voltage;
a gate electrode of the twenty-second transistor is connected with the sixth node, a first electrode of the twenty-second transistor is connected with the second node, and a second electrode of the twenty-second transistor is configured to receive the fourth voltage;
a gate electrode of the twenty-third transistor is connected with the sixth node, a first electrode of the twenty-third transistor is connected with the second output signal terminal, and a second electrode of the twenty-third transistor is configured to receive a fifth voltage;
a gate electrode of the twenty-fourth transistor is connected with the fifth node, a first electrode of the twenty-fourth transistor is connected with the second node, and a second electrode of the twenty-fourth transistor is configured to receive the fourth voltage; and
a gate electrode of the twenty-fifth transistor is connected with the fifth node, a first electrode of the twenty-fifth transistor is connected with the second output signal terminal, and a second electrode of the twenty-fifth transistor is configured to receive the fifth voltage.

6. The display substrate according to claim 4, wherein,
the first sub-unit further comprises a third output signal terminal, and the third output signal terminal is configured to output a third output signal;
the second sub-unit further comprises a fourth output signal terminal, and the fourth output signal terminal is configured to output a fourth output signal;
the first reset circuit and the second reset circuit are further configured to reset the third output signal terminal; and
the third reset circuit and the fourth reset circuit are further configured to reset the fourth output signal terminal.

7. The display substrate according to claim 4, further comprising: a common leakage prevention circuit, a first leakage prevention circuit, a second leakage prevention circuit, a third leakage prevention circuit, and a fourth leakage prevention circuit; wherein the common leakage prevention circuit is electrically connected with the first node and a seventh node, and is configured to control a level of the seventh node under control of the level of the first node;
the first leakage prevention circuit is electrically connected with the seventh node, the first reset circuit, the second reset circuit, the fifth reset circuit, and the sixth reset circuit, and is configured to prevent the first node from generating current-leakage under control of the level of the seventh node; and
the second leakage prevention circuit is electrically connected with the seventh node, the third reset circuit, the fourth reset circuit, the seventh reset circuit, and the eighth reset circuit, and is configured to prevent the second node from generating current-leakage under control of the level of the seventh node.

8. The display substrate according to claim 3, wherein the first control circuit comprises a twelfth transistor and a thirteenth transistor, the first reset circuit comprises a fourteenth transistor, a fifteenth transistor, and a sixteenth transistor, and the second reset circuit comprises a seventeenth transistor, an eighteenth transistor, and a nineteenth transistor;
a gate electrode and a first electrode of the twelfth transistor are configured to receive the second voltage, and a second electrode of the twelfth transistor is connected with the fifth node;
a gate electrode of the thirteenth transistor is connected with the first node, a first electrode of the thirteenth transistor is connected with the fifth node, and a second electrode of the thirteenth transistor is configured to receive a fourth voltage;
a gate electrode of the fourteenth transistor is connected with the fifth node, a first electrode of the fourteenth transistor is connected with the first node, and a second electrode of the fourteenth transistor is configured to receive the fourth voltage;
a gate electrode of the fifteenth transistor is connected with the fifth node, a first electrode of the fifteenth transistor is connected with the shift signal output terminal, and a second electrode of the fifteenth transistor is configured to receive the fourth voltage;
a gate electrode of the sixteenth transistor is connected with the fifth node, a first electrode of the sixteenth transistor is connected with the first output signal terminal, and a second electrode of the sixteenth transistor is configured to receive a fifth voltage;
a gate electrode of the seventeenth transistor is connected with the sixth node, a first electrode of the seventeenth transistor is connected with the first node, and a second electrode of the seventeenth transistor is configured to receive the fourth voltage;
a gate electrode of the eighteenth transistor is connected with the sixth node, a first electrode of the eighteenth transistor is connected with the shift signal output terminal, and a second electrode of the eighteenth transistor is configured to receive the fourth voltage; and
a gate electrode of the nineteenth transistor is connected with the sixth node, a first electrode of the nineteenth transistor is connected with the first output signal terminal, and a second electrode of the nineteenth transistor is configured to receive the fifth voltage.

9. The display substrate according to claim 2, wherein the second input circuit comprises an eighth transistor, and the second output circuit comprises a ninth transistor and a third capacitor;

a gate electrode of the eighth transistor is configured to receive the first input signal, a first electrode of the eighth transistor is configured to receive the first voltage, and a second electrode of the eighth transistor is connected with the second node;

a gate electrode of the ninth transistor is connected with the second node, a first electrode of the ninth transistor is configured to receive a fourth clock signal as the second output signal, and a second electrode of the ninth transistor is configured to output the second output signal; and a first electrode of the third capacitor is connected with the second node, and a second electrode of the third capacitor is connected with the second electrode of the ninth transistor.

10. The display substrate according to claim 2, wherein the first sub-unit further comprises a fifth reset circuit and a sixth reset circuit, the fifth reset circuit is configured to reset the first node in response to a display reset signal, and the sixth reset circuit is configured to reset the first node in response to a global reset signal; and the second sub-unit further comprises a seventh reset circuit and an eighth reset circuit, the seventh reset circuit is configured to reset the second node in response to the display reset signal, and the eighth reset circuit is configured to reset the second node in response to the global reset signal.

11. The display substrate according to claim 2, wherein the fifth control circuit comprises a thirty-fifth transistor and a thirty-sixth transistor;

a gate electrode of the thirty-fifth transistor is connected with the second clock sub-signal line to receive the second clock sub-signal, a first electrode of the thirty-fifth transistor is connected with the sixth node, and a second electrode of the thirty-fifth transistor is connected with a first electrode of the thirty-sixth transistor; and a gate electrode of the thirty-sixth transistor is connected with the third node, and a second electrode of the thirty-sixth transistor is configured to receive a fourth voltage;

the sixth control circuit comprises a thirty-seventh transistor;

a gate electrode of the thirty-seventh transistor is configured to receive the first input signal, a first electrode of the thirty-seventh transistor is connected with the sixth node, and a second electrode of the thirty-seventh transistor is configured to receive the fourth voltage.

12. The display substrate according to claim 1, wherein the blanking input sub-unit further comprises a second transmission circuit and a common reset circuit, the second transmission circuit is electrically connected with the second node and the fourth node, and is configured to control the level of the second node under control of the level of the fourth node or a second transmission signal; and the common reset circuit is electrically connected with the fourth node, the fifth node, and the sixth node, and is configured to reset the fourth node under control of the level of the fifth node or the sixth node.

13. The display substrate according to claim 12, wherein the first transmission circuit comprises a third transistor and the second transmission circuit comprises a fourth transistor;

a gate electrode of the third transistor is connected with the fourth node, a first electrode of the third transistor is configured to receive the first voltage, and a second electrode of the third transistor is connected with the first node; and a gate electrode of the fourth transistor is connected with the fourth node, a first electrode of the fourth transistor is configured to receive the first voltage, and a second electrode of the fourth transistor is connected with the second node.

14. The display substrate according to claim 12, wherein the common reset circuit comprises a tenth transistor and an eleventh transistor;

a gate electrode of the tenth transistor is connected with the fifth node, a first electrode of the tenth transistor is connected with the fourth node, and a second electrode of the tenth transistor is configured to receive a fourth voltage; and a gate electrode of the eleventh transistor is connected with the sixth node, a first electrode of the eleventh transistor is connected with the fourth node, and a second electrode of the eleventh transistor is configured to receive the fourth voltage.

15. The display substrate according to claim 1, wherein the selection control circuit comprises a first transistor and a first capacitor;

a gate electrode of the first transistor is configured to receive the selection control signal, a first electrode of the first transistor is configured to receive the second input signal, and a second electrode of the first transistor is connected with the third node, and a first electrode of the first capacitor is connected with the third node.

16. The display substrate according to claim 1, wherein the third input circuit comprises a second transistor;

a gate electrode of the second transistor is connected with the third node, a first electrode of the second transistor is connected with the first clock sub-signal line to receive the first clock sub-signal, and a second electrode of the second transistor is connected with the fourth node;

wherein a distance between an orthographic projection of the gate electrode of the second transistor on the base substrate and an orthographic projection of the first electrode of the second transistor on the base substrate is greater than 3 microns.

17. The display substrate according to claim 1, wherein the first input circuit comprises a fifth transistor, and the first output circuit comprises a sixth transistor, a seventh transistor, and a second capacitor;

a gate electrode of the fifth transistor is configured to receive the first input signal, a first electrode of the fifth transistor is configured to receive the first voltage, and a second electrode of the fifth transistor is connected with the first node;

a gate electrode of the sixth transistor is connected with the first node, a first electrode of the sixth transistor is configured to receive the second clock sub-signal as the shift signal, and a second electrode of the sixth transistor is configured to output the shift signal;

a gate electrode of the seventh transistor is connected with the first node, a first electrode of the seventh transistor is configured to receive a third clock signal as the first output signal, and a second electrode of the seventh transistor is configured to output the first output signal; and a first electrode of the second capacitor is connected with the first node, and a second electrode of the second capacitor is connected with the second electrode of the seventh transistor.

18. The display substrate according to claim 1, wherein the third control circuit comprises a thirty-second transistor and a thirty-third transistor;
   a gate electrode of the thirty-second transistor is connected with the second clock sub-signal line to receive the second clock sub-signal, a first electrode of the thirty-second transistor is connected with the fifth node, and a second electrode of the thirty-second transistor is connected with a first electrode of the thirty-third transistor;
   a gate electrode of the thirty-third transistor is connected with the third node, and a second electrode of the thirty-third transistor is configured to receive a fourth voltage.

19. The display substrate according to claim 1, wherein a plurality of shift register units connected with a same signal line in the plurality of shift register units, which is cascade, of the gate driving circuit are continuously arranged.

20. A display device, comprising the display substrate according to claim 1.

* * * * *